(12) United States Patent
Nishikawa et al.

(10) Patent No.: US 8,189,765 B2
(45) Date of Patent: May 29, 2012

(54) MULTICHANNEL ECHO CANCELLER

(75) Inventors: Tsuyoki Nishikawa, Osaka (JP); Takeo Kanamori, Osaka (JP); Koichiro Mizushima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1332 days.

(21) Appl. No.: 11/822,515

(22) Filed: Jul. 6, 2007

(65) Prior Publication Data

US 2008/0008333 A1    Jan. 10, 2008

(30) Foreign Application Priority Data

Jul. 6, 2006  (JP) .................................. 2006-186408

(51) Int. Cl.
*H04M 9/08* (2006.01)
*A61F 11/06* (2006.01)
*H04B 15/00* (2006.01)

(52) U.S. Cl. ........... 379/406.01; 379/406.14; 381/71.14; 381/94.3

(58) Field of Classification Search .................. None
See application file for complete search history.

(56) References Cited

U.S. PATENT DOCUMENTS

| | | | | |
|---|---|---|---|---|
| 5,761,318 | A * | 6/1998 | Shimauchi et al. | 381/66 |
| 6,246,760 | B1 * | 6/2001 | Makino et al. | 379/406.08 |
| 6,381,272 | B1 * | 4/2002 | Ali | 375/233 |
| 6,424,720 | B1 * | 7/2002 | Thomas et al. | 381/66 |
| 6,785,391 | B1 * | 8/2004 | Emura et al. | 381/61 |
| 7,359,504 | B1 * | 4/2008 | Reuss et al. | 379/406.02 |
| 2006/0002546 | A1 * | 1/2006 | Stokes et al. | 379/406.06 |
| 2006/0104458 | A1 * | 5/2006 | Kenoyer et al. | 381/92 |

FOREIGN PATENT DOCUMENTS

| | | |
|---|---|---|
| JP | 3073976 | 6/2000 |
| JP | 3407392 | 3/2003 |
| JP | 2004-048253 | 2/2004 |
| JP | 2006-208075 | 8/2006 |

OTHER PUBLICATIONS

Japanese Office Action issued Oct. 19, 2011 in corresponding Japanese Patent Application No. 2007-175430 w/partial translation.
Ayako Takahashi et al. "A Consideration on a Echo Canceller Using Blind Signal Separation Technique", Technical Report of the Institute of Image Information and Television Engineers, the Institute of Image Information and Television Engineers, Jan. 26, 2004, vol. 28, No. 69, pp. 5-8, w/partial translation.

* cited by examiner

*Primary Examiner* — Fan Tsang
*Assistant Examiner* — Jeffrey Lytle
(74) *Attorney, Agent, or Firm* — Wenderoth, Lind & Ponack, L.L.P.

(57) ABSTRACT

A multichannel echo canceller according to the present invention includes an echo cancellation section which receives loudspeaker input signals sp1, sp2 including a second acoustic signal to be respectively inputted to a plurality of loudspeakers 10, 20 provided in a first location and detection signals m1, m2 detected by a plurality of microphones 11, 21 provided in the first location; separates a first acoustic signal and a second acoustic signal, which are included in the detection signals m1, m2, by performing signal processing based on an independent component analysis; cancels as an echo the second acoustic signal, which is included in the detection signals m1, m2, by outputting only the separated first acoustic signal to a plurality of loudspeakers 30, 40 provided in a second location.

13 Claims, 8 Drawing Sheets

MULTICHANNEL ECHO CANCELLER

BACKGROUND OF THE INVENTION

1. Field of the Invention

The present invention relates to a multichannel echo canceller and more particularly, to a multichannel echo canceller which is used in a conferencing system, a handsfree telephone, or the like.

2. Description of the Background Art

In recent years, a multichannel acoustic system, such as a conferencing system and a handsfree telephone, in which acoustic signals which are voices of speakers in remote locations are transmitted in an interactive manner has been realized. In a case where this kind of an acoustic system is realized, for example, between a first location and a second location, a plurality of microphones for detecting the voices of speakers and a plurality of loudspeakers with which the voices of speakers in remote locations are listened are provided in the first location and the second location, respectively. The loudspeakers in the first location are connected to the microphones in the second location and the microphones in the first location are connected to the loudspeakers in the second location. Thus, for example, a speaker S1 who is present in the first location can listen to, through the loudspeakers in the first location, a voice of a speaker S2 who is present in the second location. The speaker S1 can also deliver his or her voice, through the microphones in the first location, to the speaker S2.

However, such an acoustic system has a problem that it is required to cancel an echo. For example, when the speaker S2 outputs a voice, a sound of the voice is amplified via the microphones in the second location by the loudspeakers in the first location. Here, the microphones are provided in the first location. Therefore, the sound of the voice of the speaker S2, which has been amplified by the loudspeakers in the first location, is detected by the microphones in the first location. As a result, the speaker S2, when listening to a voice of the speaker S1, also hear the voice of himself or herself through the loudspeakers in the second location. As described above, a voice outputted by a speaker, which has been amplified by the loudspeakers for listening to a voice of another speaker who is present in a remote location, results in an echo which is unwanted for the speaker outputting the voice.

Therefore, as a multichannel echo canceller for canceling such an echo, a multichannel echo canceller using adaptive filters has conventionally been proposed. FIG. 8 is a diagram illustrating a configuration of a conventional multichannel echo canceller 9 using the adaptive filter, which is used in an acoustic system. In FIG. 8, a case where the acoustic system has two channels is shown. In the acoustic system shown in FIG. 8, it is assumed that a speaker S1 is present as a sound source on a near end (near-end sound source) and a speaker S2 is present as a sound source on a far end (far-end sound source). On the near end, loudspeakers 10 and 20 for amplifying, in a stereo manner, a sound of a far-end acoustic signal of a voice which the speaker S2 on the far end outputs and microphones 11 and 21 for detecting a near-end acoustic signal of a voice which the speaker S1 on the near end outputs are provided. On the far end, loudspeakers 30 and 40 for amplifying, in a stereo manner, a sound of the near-end acoustic signal and microphones 31 and 41 for detecting the far-end acoustic signal are provided. In the acoustic system shown in FIG. 8, as one example, it is assumed that the multichannel echo canceller 9 is provided only on the near end.

In FIG. 8, the multichannel echo canceller 9 comprises adaptive filters 91 to 94, adders 95 and 97, and subtracters 96 and 98. The adaptive filter 91, based on an output signal from the subtracter 96, estimates a transfer characteristic $h11(\omega)$ from the loudspeaker 10 to the microphone 11. The $\omega$ is a frequency. The adaptive filter 91 convolves an estimated result $eh11(\omega)$ to a loudspeaker input signal sp1 to be inputted to the loudspeaker 10 and outputs a resultant. The adaptive filter 92, based on an output signal from the subtracter 96, estimates a transfer characteristic $h21(\omega)$ from the loudspeaker 20 to the microphone 11. The adaptive filter 92 convolves an estimated result $eh21(\omega)$ to a loudspeaker input signal sp2 to be inputted to the loudspeaker 20 and outputs a resultant. The adaptive filter 93, based on an output signal from the subtracter 98, estimates a transfer characteristic $h12(\omega)$ from the loudspeaker 10 to the microphone 21. The adaptive filter 93 convolves an estimated result $eh12(\omega)$ to a loudspeaker input signal sp1 to be inputted to the loudspeaker 10 and outputs a resultant. The adaptive filter 94, based on an output signal from the subtracter 98, estimates a transfer characteristic $h22(\omega)$ from the loudspeakers 20 to the microphone 21. The adaptive filter 94 convolves an estimated result $eh22(\omega)$ to a loudspeaker input signal sp2 to be inputted to the loudspeaker 20 and outputs a resultant.

The adder 95 receives an output signal from the adaptive filter 91 and an output signal from the adaptive filter 92 and adds these output signals. The subtracter 96 receives a detection signal m1 detected by the microphone 11 and an output signal from the adder 95 and subtracts, from the detection signal m1, the output signal from the adder 95. Thus, an output signal y1 from the subtracter 96 becomes a signal in which a voice of the speaker S2 on the far end, which is an echo, is cancelled. The output signal y1 from the subtracter 96 is transmitted to the far end and amplified by the loudspeaker 30 on the far end. The adder 97 receives an output signal from the adaptive filter 93 and an output signal from the adaptive filter 94 and adds these output signals. The subtracter 98 receives a detection signal m2 detected by the microphone 21 and an output signal from the adder 97 and subtracts, from the detection signal m2, the output signal from the adder 97. Thus, an output signal y2 from the subtracter 98 becomes a signal in which a voice of the speaker S2 on the far end, which is an echo, is cancelled. The output signal y2 from the subtracter 98 is transmitted to the far end and amplified by the loudspeaker 40 on the far end.

Here, when the adaptive filters 91 to 94 estimate the transfer characteristics, a learning identification method (LMS) which is generally used as a learning method for an adaptive filter is utilized. Specifically, the adaptive filters 91 and 92 estimate the transfer characteristics so that a power of the output signal y1 from the subtracter 96 becomes minimum. The adaptive filters 93 and 94 estimate the transfer characteristics so that a power of the output signal y2 from the subtracter 98 becomes minimum.

Hereinunder, problems of the conventional multichannel echo canceller 9 will be described. In FIG. 8, in order to obtain an echo cancellation effect, correct transfer characteristics are required to be estimated in the adaptive filters 91 to 94. For example, in a case of the adaptive filter 91, it is required that the estimated result $eh11(\omega)$ corresponds to the transfer characteristic $h11(\omega)$. However, in the conventional multichannel echo canceller 9, only in a state where only either one of the loudspeaker input signal sp1 or the loudspeaker input signal sp2 has been amplified, correct transfer characteristics can be estimated. In other words, in the conventional multichannel echo canceller 9, only in a state of monaural reproduction in which only either one of the loudspeaker 10 or the loudspeaker 20 operates, the correct transfer characteristic can be estimated.

When multichannel reproduction is performed (herein, when stereo reproduction is performed), both of the loudspeaker 10 and the loudspeaker 20 usually operate and correlated signals are inputted to the loudspeaker 10 and the loudspeaker 20. For example, in the microphones 31 and 41 on the far end shown in FIG. 8, it is assumed that a voice of the speaker S2 is detected in a stereo manner. Also it is assumed that the voice of the speaker S2 is $s2(\omega)$; a transfer characteristic from the speaker S2 to the microphone 31 is $a21(\omega)$; and a transfer characteristic from the speaker S2 to the microphones 41 is $a22(\omega)$. At this time, the loudspeaker input signal sp1 inputted to the loudspeaker 10 becomes $s2(\omega) \cdot a21(\omega)$ and the loudspeaker input signal sp2 inputted to the loudspeaker 20 becomes $s2(\omega) \cdot a22(\omega)$. Because the loudspeaker input signal sp1 and the loudspeaker input signal sp2 both include $s2(\omega)$, the loudspeaker input signal sp1 and the loudspeaker input signal sp2 are correlated. In the detection signal $m1(\omega)$ detected by the microphone 11, a formula (1) is satisfied.

[Formula 1]

$$m1(\omega)=s2(\omega)a21(\omega)h11(\omega)+s2(\omega)a22(\omega)h21(\omega)+s1(\omega)a11(\omega)=s2(\omega)\{a21(\omega)h11(\omega)+a22(\omega)h21(\omega)\}+s1(\omega)a11(\omega) \quad (1)$$

A component $s2(\omega)$ represented in the formula (1) is an echo. Therefore, the adaptive filters 91 and 92 are only required to estimate transfer characteristics so that an output signal from the adder 95, which is an echo replica, becomes the same as the component $s2(\omega)$ represented in the formula (1). When the output signal from the adder 95 becomes the same as the component $s2(\omega)$ represented in the formula (1), the power of the output signal y1 becomes minimum (in other words, only the $s1(\omega)$ component remains) and the echo is cancelled.

However, $m1(\omega)$ represented in the formula (1) includes a component which is obtained by multiplying $s2(\omega)$ by a predetermined transfer characteristic and the loudspeaker input signals sp1 and sp2 also include components which are obtained by multiplying $s2(\omega)$ by predetermined transfer characteristics. This means that by using either one of the loudspeaker input signal sp1 or the loudspeaker input signal sp2, the $s2(\omega)$ component represented in the formula (1) can be reproduced. Accordingly, for the transfer characteristic $eh11(\omega)$ estimated by the adaptive filter 91 and the transfer characteristic $eh21(\omega)$ estimated by the adaptive filter 92, a plurality of solutions (for example, a formula (2) or a formula (3)) exist, respectively.

[Formula 2]

$$eh11(\omega)=\{a21(\omega)h11(\omega)+a22(\omega)h21(\omega)\}/a21(\omega), \quad eh21(\omega)=0 \quad (2)$$

[Formula 3]

$$eh11(\omega)=0, \quad eh21(\omega)=\{a21(\omega)h11(\omega)+a22(\omega)h21(\omega)\}/a22(\omega) \quad (3)$$

As described above, when the multichannel reproduction is performed, the conventional multichannel echo canceller 9 is not capable of estimating correct transfer characteristics due to inconstant solutions, thereby leading to a problem that an echo cancellation effect cannot be obtained in a stable manner.

Therefore, a technique which selects one channel, for which estimation processing is to be performed, by determining whether a signal level of each channel is high or low (for example, Japanese Patent No. 3407392, etc.) has conventionally been proposed. In addition, a technique which estimates correct transfer characteristics by adding additional signals to the loudspeaker input signal sp1 and the loudspeaker input signal sp2 (for example, Japanese Patent No. 3073976, etc.) has also been proposed. Conventionally, these techniques have been adopted as countermeasures to the inconstant solutions in the conventional multichannel echo canceller 9.

However, in a case where a difference in signal levels between channels is small, the technique disclosed in Japanese Patent No. 3407392 cannot correctly determine whether a signal level of each channel is high or low and cannot estimate correct transfer characteristics. Therefore, the technique disclosed in Japanese Patent No. 3407392 cannot perform the echo cancellation in an invariably stable manner. In addition, the technique disclosed in Japanese Patent No. 3073976 adds the additional signals to the loudspeaker input signal sp1 and the loudspeaker input signal sp2 in order to estimate correct transfer characteristics. Because of this, the additional signals, in addition to a voice of a speaker, are amplified, thereby leading to a problem of deteriorating sound quality due to the additional signals. As described above, the technique disclosed in Japanese Patent No. 3407392 and the technique disclosed in Japanese Patent No. 3073976 which have been proposed as the countermeasures to the inconstant solutions are not capable of performing the echo cancellation in an invariably stable manner and deteriorate the sound quality.

SUMMARY OF THE INVENTION

Therefore, an object of the present invention is to provide a multichannel echo canceller which enables invariably stable echo cancellation in multichannel reproduction without deteriorating sound quality and is capable of stably cancelling echoes regardless of which is performed, a double talk or a single talk.

In order to solve the above-mentioned problem, the present invention is directed to a multichannel echo canceller used in an acoustic system in which a first acoustic signal, from one or more sound sources present in a first location, which is detected by a plurality of microphones provided in the first location and a second acoustic signal, from one or more sound sources present in a second location, which is detected by a plurality of microphones provided in the second location are transmitted between the first location and the second location in an interactive manner by using a plurality of loudspeakers provided in the first location and a plurality of loudspeakers provided in the second location, wherein the plurality of microphones provided in the first location further detect, in addition to the first acoustic signal, the second acoustic signal which is outputted from the plurality of loudspeakers provided in the first location, the multichannel echo canceller including an echo cancellation section which receives loudspeaker input signals including the second acoustic signal to be inputted to the plurality of loudspeakers provided in the first location and detection signals detected by the plurality of microphones provided in the first location; separates the first acoustic signal and the second acoustic signal, which are included in the detection signals, by performing signal processing based on an independent component analysis; and cancels as an echo the second acoustic signal included in each of the detection signals by outputting only the separated first acoustic signal to the plurality of loudspeakers provided in the second location.

By performing the signal processing based on the independent component analysis, even if the second acoustic signals having correlations in the loudspeaker input signals are included, the first acoustic signal and the second acoustic signal which are included in the detection signals can be separated. Thus, it is made possible to perform invariably stable echo cancellation in the multichannel reproduction while solving the problem of the inconstant solutions, without deteriorating sound quality. Furthermore, regardless of which is performed, a double talk or a single talk, stable echo cancellation is enabled.

The above-mentioned first location corresponds to, for example, a location on a near end which will be mentioned in the below described embodiments. The above-mentioned first acoustic signal corresponds to, for example, a near-end acoustic signal which will be mentioned in the below-described embodiments. The above-mentioned second location corresponds to, for example, a location on a far end which will be mentioned in the below-described embodiments. The above-mentioned second acoustic signal corresponds to, for example, a far-end acoustic signal which will be mentioned in the below-described embodiments.

More preferably, the echo cancellation section has a sound source separation section which receives the loudspeaker input signals and the detection signals; by performing the signal processing based on the independent component analysis; separates the first acoustic signal and the second acoustic signal, which are included in the detection signals, and signals included in the first acoustic signal and having low correlations among one another, a number of the signals to be separated corresponding to a number of the detection signals; and outputs only the separated signals having low correlations among one another to the plurality of loudspeakers provided in the second location.

More preferably, the echo cancellation section has a plurality of sound source separation sections which are provided so as to respectively correspond to the plurality of microphones provided in the first location, each of which plurality of sound source separation sections receives a detection signal which is detected by each of the plurality of microphones in a corresponding manner and loudspeaker input signals; by performing the signal processing based on the independent component analysis, separates the first acoustic signal and the second acoustic signal which are included in the detection signal which is detected by the each of the plurality of microphones in the corresponding manner; and outputs only the separated first acoustic signal to any one of the loudspeakers provided in the second location.

More preferably, in the echo cancellation section, a separation matrix for separating the first acoustic signal and the second acoustic signal which are included in the detection signals is previously set, the separation matrix includes a plurality of first matrix elements which are relevant to transfer characteristics from the plurality of loudspeakers provided in the first location to the plurality of microphones provided in the first location and are learned in accordance with the independent component analysis, and the echo cancellation section separates the first acoustic signal and the second acoustic signal, which are included in the detection signals, by multiplying an input vector including the loudspeaker input signals and the detection signals by the separation matrix and subtracting the second acoustic signal, which is included in the detection signals, from the detection signals.

More preferably, the separation matrix further includes a plurality of second matrix elements which are relevant to transfer characteristics from the one or more sound sources present in the second location to the plurality of microphones provided in the second location, and among the plurality of second matrix elements, matrix elements other than diagonal matrix elements in the separation matrix are set to 0.

More preferably, the separation matrix further includes a plurality of second matrix elements for, by using the detection signals, separating signals, which are included in the second acoustic signal in each of the loudspeaker input signals and have low correlations among one another, a number of the signals to be separated corresponding to a number of the loudspeaker input signals, and all of the plurality of second matrix elements are 0.

More preferably, the separation matrix further includes: a plurality of second matrix elements which are relevant to transfer characteristics from the one or more sound sources present in the second location to the plurality of microphones provided in the second location; and a plurality of third matrix elements for, by using the detection signals, separating signals, which are included in the second acoustic signal in each of the loudspeaker input signals and have low correlations among one another, a number of the signals to be separated corresponding to a number of the loudspeaker input signals, and among the plurality of second matrix elements, matrix elements other than diagonal matrix elements in the separation matrix are set to 0 and all of the plurality of third matrix elements are set to 0.

More preferably, the separation matrix further includes a plurality of second matrix elements which are relevant to transfer characteristics from the one or more sound sources present in the first location to the plurality of microphones provided in the first location, and among the plurality of second matrix elements, matrix elements other than diagonal matrix elements in the separation matrix are set to 0.

The present invention is also directed to a multichannel echo cancellation method used in an acoustic system in which a first acoustic signal, from one or more sound sources present in a first location, which is detected by a plurality of microphones provided in the first location and a second acoustic signal, from one or more sound sources present in a second location, which is detected by a plurality of microphones provided in the second location are transmitted between the first location and the second location in an interactive manner by using a plurality of loudspeakers provided in the first location and a plurality of loudspeakers provided in the second location, wherein the plurality of microphones provided in the first location further detect, in addition to the first acoustic signal, the second acoustic signal which is outputted from the plurality of loudspeakers provided in the first location, the multichannel echo cancellation method having: an inputting step of receiving loudspeaker input signals including the second acoustic signal to be inputted to the plurality of loudspeakers provided in the first location and detection signals detected by the plurality of microphones provided in the first location; a separation step of separating the first acoustic signal and the second acoustic signal, which are included in the detection signals, by subjecting the loudspeaker input signals and detection signals, which are inputted at the inputting step, to signal processing based on an independent component analysis; and a cancellation step of cancelling as an echo the second acoustic signal included in each of the detection signals by outputting only the first acoustic signal, which is separated at the separation step, to the plurality of loudspeakers provided in the second location.

More preferably, the separation step has: a first signal calculation step of calculating a plurality of output signals included in an output vector which is obtained as a result of multiplication in which an input vector including the loudspeaker input signals and the detection signals, which are inputted at the inputting step, is multiplied by a separation matrix, for separating the first acoustic signal and the second acoustic signal which are included in the detection signals, which separation matrix includes a plurality of matrix elements which are relevant to transfer characteristics from the plurality of loudspeakers provided in the first location to the plurality of microphones provided in the first location; a matrix calculation step of calculating a correlation matrix which has matrix elements of high-order correlations among the output signals which are calculated at the first signal calculation step; a learning step of learning the matrix elements, which are included in the separation matrix to be updated, by using the correlation matrix calculated at the matrix calculation step; an updating step of updating the matrix elements included in the separation matrix, which is used at the first signal calculation step, to the matrix elements which are learned at the learning step; and a second signal calculation step of calculating a plurality of output signals in the output vector of which first acoustic signal and second acoustic signal included in the detection signals are separated, by multiplying the input vector including the loudspeaker input signals and the detection signals, which are inputted at the inputting step, by the separation matrix whose matrix elements are updated at the updating step, and the cancellation step outputs, among the output signals calculated at the second signal calculation step, an output signal which includes only the first acoustic signals, to the plurality of loudspeakers provided in the second location.

The present invention is also directed to a program which is executed by a computer used in an acoustic system in which a first acoustic signal, from one or more sound sources present in a first location, which is detected by a plurality of microphones provided in the first location and a second acoustic signal, from one or more sound sources present in a second location, which is detected by a plurality of microphones provided in the second location are transmitted between the first location and the second location in an interactive manner by using a plurality of loudspeakers provided in the first location and a plurality of loudspeakers provided in the second location, wherein the plurality of microphones provided in the first location further detect, in addition to the first acoustic signal, the second acoustic signal which is outputted from the plurality of loudspeakers provided in the first location, and the computer is caused to execute: an inputting step of receiving loudspeaker input signals including the second acoustic signal to be inputted to the plurality of loudspeakers provided in the first location and detection signals detected by the plurality of microphones provided in the first location; a separation step of separating the first acoustic signal and the second acoustic signal, which are included in the detection signals, by subjecting the loudspeaker input signals and detection signals, which are inputted at the inputting step, to signal processing based on an independent component analysis; and a cancellation step of cancelling as an echo the second acoustic signal included in each of the detection signals by outputting only the first acoustic signal, which is separated at the separation step, to the plurality of loudspeakers provided in the second location.

The present invention is also directed to an integrated circuit used in an acoustic system in which a first acoustic signal, from one or more sound sources present in a first location, which is detected by a plurality of microphones provided in the first location and a second acoustic signal, from one or more sound sources present in a second location, which is detected by a plurality of microphones provided in the second location are transmitted between the first location and the second location in an interactive manner by using a plurality of loudspeakers provided in the first location and a plurality of loudspeakers provided in the second location, wherein the plurality of microphones provided in the first location further detect, in addition to the first acoustic signal, the second acoustic signal which is outputted from the plurality of loudspeakers provided in the first location, the integrated circuit including an echo cancellation section which receives loudspeaker input signals including the second acoustic signal to be inputted to the plurality of loudspeakers provided in the first location and detection signals detected by the plurality of microphones provided in the first location; separates the first acoustic signal and the second acoustic signal, which are included in the detection signals, by performing signal processing based on an independent component analysis; and cancels as an echo the second acoustic signal included in each of the detection signals by outputting only the separated first acoustic signal to the plurality of loudspeakers provided in the second location.

The present invention is also directed to a multichannel echo canceller operable to cancel as an echo an acoustic signal, which is outputted from a plurality of loudspeakers, for detection signals detected by one or more microphones including the acoustic signal outputted from the plurality of loudspeakers, in addition to an acoustic signal, which is to be detected, of a sound source on a near end, and to output only the acoustic signal of the sound source on the near end, the multichannel echo canceller including a sound source separation section for receiving detection signals, detected by the one or more microphones, which include the acoustic signal of the sound source on the near end and the acoustic signal outputted from the loudspeakers, and loudspeaker input signals, having a sense of direction of sound, to be inputted to the loudspeakers; separating the acoustic signal, which is included in the detection signals detected by the one or more microphones, of the sound source on the near end and the acoustic signal outputted from the loudspeakers, by performing an adaptive operation such that at a predetermined time when the acoustic signal of the sound source on the near end and the acoustic signal outputted from the loudspeakers are simultaneously detected by the one or more microphones, a signal to be outputted becomes a signal holding sound quality of the acoustic signal of the sound source on the near end and the signal to be outputted becomes a signal in which the acoustic signal outputted from the loudspeakers is cancelled; and outputting only the separated acoustic signal of the sound source on the near end.

The acoustic signal from the sound source on the near end is a signal which indicates sound generated from one or more sound sources present in a location where one or more microphones are provided, statistics having characteristics of the sound, and the like and is a signal in which for the detection signals detected by one or more microphones, the acoustic signal amplified by the plurality of loudspeakers is cancelled. The loudspeaker input signal having the sense of direction of sound means a signal, which can reproduce, for example, a plurality of characteristics (a level ratio, a time delay, etc.) of the acoustic signal detected by the microphones on the far end, by using the plurality of loudspeakers on the near end. The signal holding sound quality means a signal which holds frequency characteristics (amplitude-frequency characteristics, amplitude-phase-frequency characteristics, etc.) which the acoustic signal on the sound source on the near end, inputted to the sound source separation section, has.

More preferably, the sound source separation section estimates transfer characteristics from the loudspeakers to the one or more microphones; calculates the acoustic signal, which is outputted from the loudspeakers and detected by the one or more microphones, by using the estimated transfer characteristics; and performs the adaptive operation so as to subtract the calculated acoustic signal from the detection signals detected by the one or more microphones.

According to the present invention, it is made possible to provide the multichannel echo canceller which is capable of cancelling echoes in an invariably stable manner in the multichannel reproduction without deteriorating sound quality and enables stable echo cancellation regardless of which is performed, a double talk or a single talk.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinunder, embodiments of the present invention will be described with reference to figures.

First Embodiment

Figure 1:
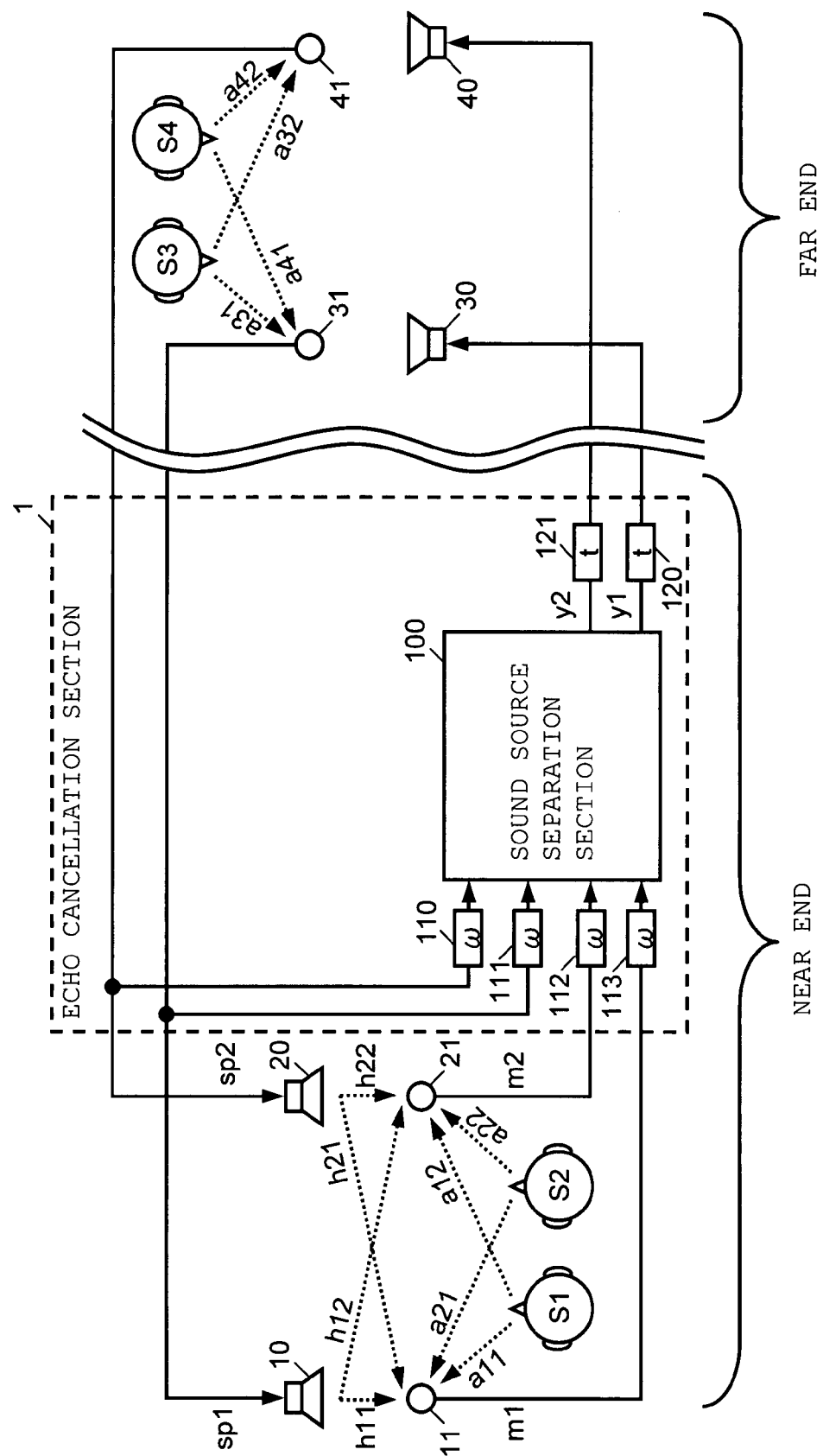
FIG. 1 is a diagram illustrating an exemplary configuration of a multichannel echo canceller according to a first embodiment, which is used in an acoustic system.
Figure 8:
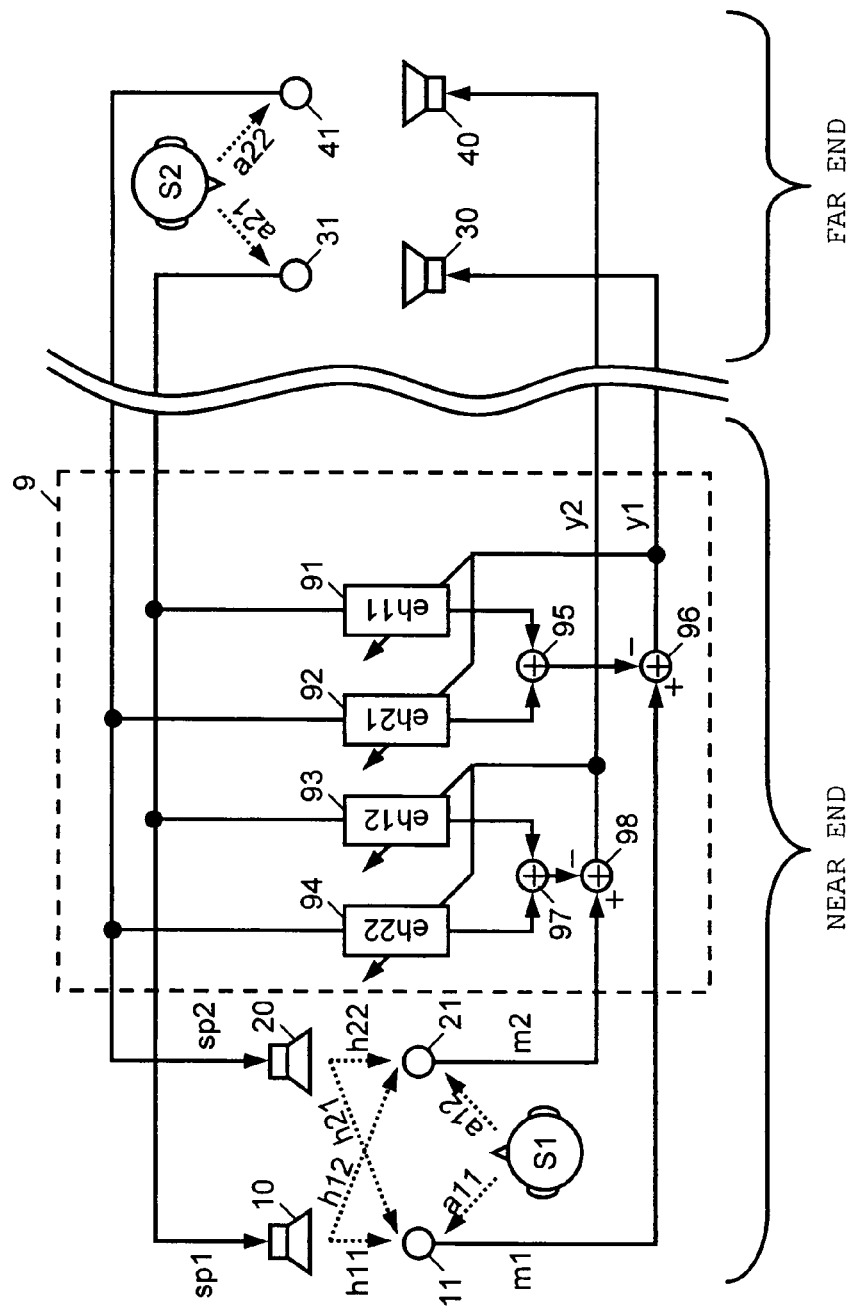
FIG. 8 is a diagram illustrating a configuration of a conventional multichannel echo canceller 9 using a conventional adaptive filter.

With reference to FIG. 1, a configuration of a multichannel echo canceller according to a first embodiment of the present invention will be described. FIG. 1 is a diagram illustrating an exemplary configuration of the multichannel echo canceller according to the first embodiment, which is used in an acoustic system. The acoustic system is a system in which acoustic signals are transmitted in an interactive manner between a location on a near end and a location on a far end. In the acoustic system shown in FIG. 1, it is assumed that on the near end, speakers S1 and S2 are present as a plurality of sound sources which are different from each other (near-end sound sources) and on the far end, speakers S3 and S4 are present as a plurality of sound sources which are different from each other (far-end sound sources). On the near end, loudspeakers 10 and 20 for amplifying far-end acoustic signals of voices of the speakers S3 and S4 on the far end and microphones 11 and 21 for detecting near-end acoustic signals of voices of the speakers S1 and S2 on the near end are provided. On the far end, loudspeakers 30 and 40 for amplifying near-end acoustic signals and microphones 31 and 41 for detecting far-end acoustic signals are provided. The loudspeakers (10, 20, 30, and 40) and the microphones (11, 21, 31, and 41) are the same as those described with reference to FIG. 8 and the same reference numerals are used. In the acoustic system shown in FIG. 1, as one example, it is assumed that the multichannel echo canceller according to the present embodiment is provided only on the near end. In the acoustic system shown in FIG. 1, as one example, it is also assumed that the so-called double talk, in which the speakers S1 and S2 on the near end simultaneously converse with the speakers S3 and S4 on the far end, is carried out.

In FIG. 1, the multichannel echo canceller according to the present embodiment includes an echo cancellation section 1. The echo cancellation section 1 includes a sound source separation section 100, conversion sections 110 to 113, and reverse conversion sections 120 and 121.

The conversion section 110 receives a loudspeaker input signal sp2(t) including a far-end acoustic signal to be inputted to the loudspeaker 20 and converts the loudspeaker input signal sp2(t) from a time-domain signal (t) to a frequency-domain signal ($\omega$). The loudspeaker input signal sp2($\omega$) which has undergone the conversion in the conversion section 110 is outputted to the sound source separation section 100. The conversion section 111 receives a loudspeaker input signal sp1(t) including a far-end acoustic signal to be inputted to the loudspeaker 10 and converts the loudspeaker input signal sp1(t) from a time-domain signal (t) to a frequency-domain signal ($\omega$). The loudspeaker input signal sp1($\omega$) which has undergone the conversion in the conversion section 111 is outputted to the sound source separation section 100. The conversion section 112 receives a detection signal m2(t) including a near-end acoustic signal detected by the microphone 21 and a far-end acoustic signal detected by the microphone 21 and amplified by the loudspeakers 10 and 20 and converts the detection signal m2(t) from a time-domain signal (t) to a frequency-domain signal ($\omega$). The detection signal m2($\omega$) which has undergone the conversion in the conversion section 112 is outputted to the sound source separation section 100. The conversion section 113 receives a detection signal m1(t) which includes a near-end acoustic signal detected by the microphone 11 and a far-end acoustic signal detected by the microphone 11 and amplified by the loudspeakers 10 and 20 and converts the detection signal m1(t) from a time-domain signal (t) to a frequency-domain signal ($\omega$). The detection signal m1($\omega$) which has undergone the conversion in the conversion section 113 is outputted to the sound source separation section 100.

The sound source separation section 100 receives the detection signals (m1($\omega$), m2($\omega$)) and the loudspeaker input signals (sp1($\omega$), sp2($\omega$)). The sound source separation section 100 subjects the received signals to sound source separation processing based on an independent component analysis. Through this sound source separation processing, the near-end acoustic signals and far-end acoustic signals included in the detection signals (m1($\omega$), (m2($\omega$)) are separated. The sound source separation processing based on the independent component analysis will be described later in detail. The sound source separation section 100 outputs only the separated near-end acoustic signals as output signals y1($\omega$) and y2($\omega$). Here, the far-end acoustic signals of voices of the speakers S3 and S4 on the far end correspond to unnecessary signals, i.e. echoes. Accordingly, only the near-end acoustic signals is outputted from the sound source separation section 100, thereby making it possible to cancel the far-end acoustic signals included in the detection signals (m1($\omega$), m2($\omega$) as an echo.

The reverse conversion section 120 receives the output signal y1($\omega$) from the sound source separation section 100 and converts the output signal y1($\omega$) from a frequency-domain signal ($\omega$) to a time-domain signal (t). The acoustic signal y1(t) which has undergone the conversion in the reverse conversion section 120 is outputted to the loudspeaker 30 and amplified by the loudspeaker 30. The reverse conversion section 121 receives the output signal y2(ω) from the sound source separation section 100 and converts the output signal y2(ω) from a frequency-domain signal (ω) to a time-domain signal (t). The output signal y2(t) which has undergone the conversion in the reverse conversion section 121 is outputted to the loudspeaker 40 and amplified by the loudspeaker 40.

Hereinunder, the sound source separation processing, which is performed in the sound source separation section 100, based on the independent component analysis will be described in detail. First, the detection signals (m1(ω), m2(ω)) and the loudspeaker input signals (sp1(ω), sp2(ω)) inputted to the sound source separation section 100 will be described in detail. The detection signals (m1(ω), m2(ω)) and the loudspeaker input signals (sp1(ω), sp2(ω)) are represented as in formula 4.

[Formula 4]

$$m1(w)=s1(w) \cdot a11(w)+s2(w) \cdot a21(w)+sp1(w) \cdot h11(w)+sp2(w) \cdot h21(w)$$

$$m2(w)=s1(w) \cdot a12(w)+s2(w) \cdot a22(w)+sp1(w) \cdot h12(w)+sp2(w) \cdot h22(w)$$

$$sp1(w)=s3(w) \cdot a31(w)+s4(w) \cdot a41(w)$$

$$sp2(w)=s3(w) \cdot a32(w)+s4(w) \cdot a42(w) \qquad (4)$$

In the formula (4), it is assumed that a voice of the speaker S1 is s1(ω); a voice of the speaker S2 is s2(ω); a voice of the speaker S3 is s3(ω); and a voice of the speaker S4 is s4(ω). It is also assumed that transfer characteristic from the speaker S1 to the microphone 11 is a11(ω); a transfer characteristic from the speaker S1 to the microphone 21 is a12(ω); a transfer characteristic from the speaker S2 to the microphone 11 is a21(ω); a transfer characteristic from the speaker S2 to the microphone 21 is a22(ω); a transfer characteristic from the speaker S3 to the microphone 31 is a31(ω); a transfer characteristic from the speaker S3 to the microphone 41 is a32(ω); a transfer characteristic from the speaker S4 to the microphone 31 is a41(ω); and a transfer characteristic from the speaker S4 to the microphone 41 is a42(ω).

Figure 2:
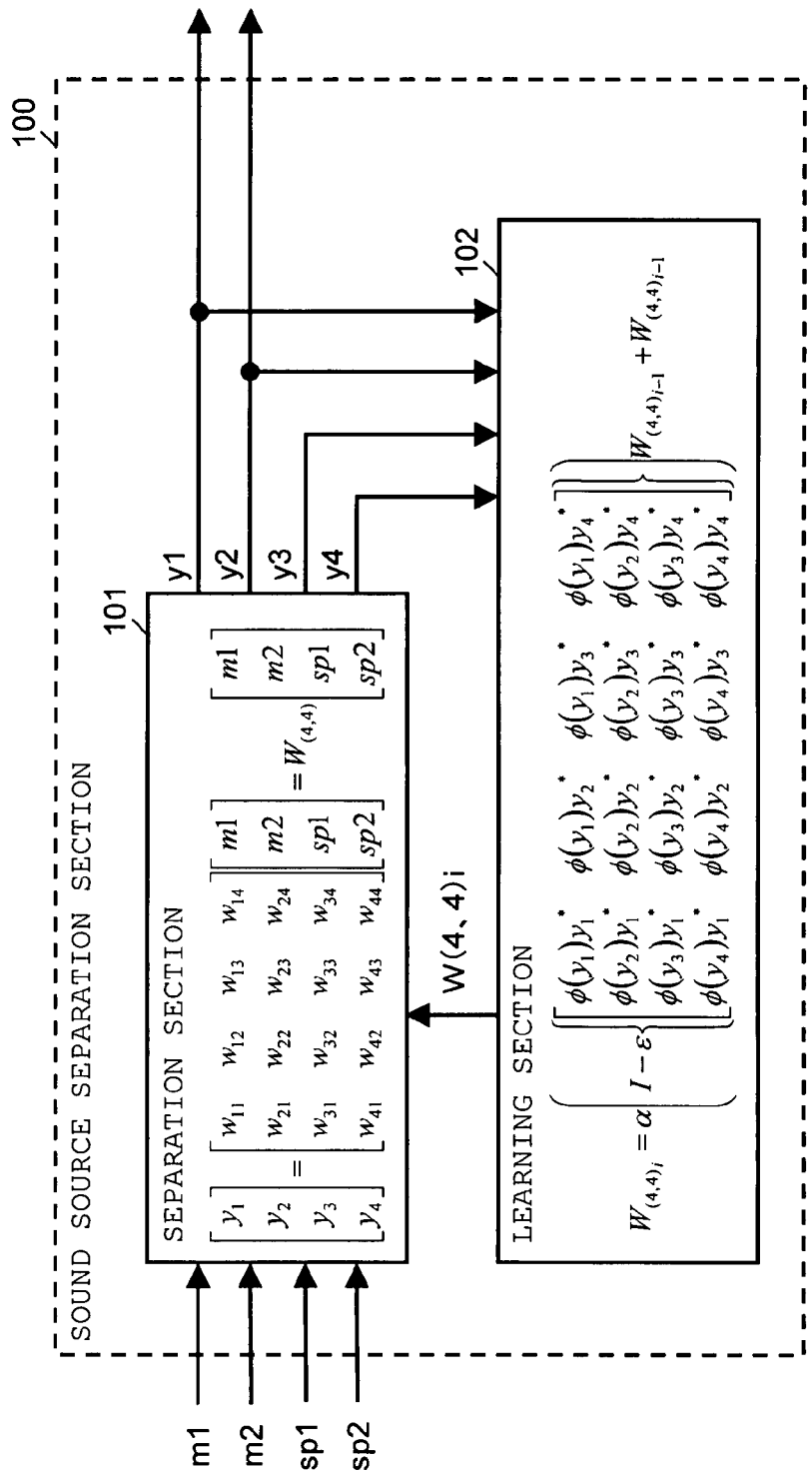
FIG. 2 is a diagram showing a detailed configuration of a sound source separation section 100.

Next, with reference to FIG. 2, a detailed configuration of the sound source separation section 100 will be described. FIG. 2 is a diagram showing the detailed configuration of the sound source separation section 100. In FIG. 2, the sound source separation section 100 comprises a separation section 101 and a learning section 102.

In the separation section 101, a separation matrix W (4, 4) with matrix elements wij (the number of rows i and the number of columns j are integers 1 through 4) is set. It is assumed that in an initial state, for example, the separation matrix W (4, 4) is set as a unit matrix. The detection signals (m1(ω), m2(ω)) and the loudspeaker input signals (sp1(ω), sp2(ω)) are inputted to the separation section 101. The separation section 101 respectively calculates the output signals y1 to y4 using a formula (5) based on the set separation matrix W (4, 4) and respectively outputs the calculated output signals y1 to y4. Specifically, as shown in the formula (5), the separation section 101 calculates an output vector including the output signals y1(ω) to y4(ω) by multiplying an input vector including the detection signals (m1(ω), m2(ω)) and the loudspeaker input signals (sp1(ω), sp2(ω)) by the set separation matrix W (4, 4).

[Formula 5]

$$\begin{bmatrix} y_1 \\ y_2 \\ y_3 \\ y_4 \end{bmatrix} = \begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix} \begin{bmatrix} m1 \\ m2 \\ sp1 \\ sp2 \end{bmatrix} = W_{(4,4)} \begin{bmatrix} m1 \\ m2 \\ sp1 \\ sp2 \end{bmatrix} \qquad (5)$$

The learning section 102 receives the output signals y1(ω) to y4(ω) and in accordance with the independent component analysis, learns the separation matrix W (4, 4). Specifically, the learning section 102 learns the separation matrix W (4, 4) such that the output signals y1(ω) to y4(ω) become independent of one another. Here, being independent means that there is no correlation, that is, correlation is 0 (zero). The learning section 102 updates the separation matrix W (4, 4), which has been set in the separation section 101, to the learned separation matrix W (4, 4).

Hereinunder, a learning method of the learning section 102 will be more specifically described. A formula (6) is a learning formula which is generally used for an independent component analysis of a frequency-domain, in which a gradient method is used. Note that a learning formula used for the independent component analysis is not limited to the formula (6) and other learning formulae may be used.

[Formula 6]

$$W_{(4,4)_i} = \alpha \left( I - \varepsilon \left\{ \begin{bmatrix} \phi(y_1)y_1^* & \phi(y_1)y_2^* & \phi(y_1)y_3^* & \phi(y_1)y_4^* \\ \phi(y_2)y_1^* & \phi(y_2)y_2^* & \phi(y_2)y_3^* & \phi(y_2)y_4^* \\ \phi(y_3)y_1^* & \phi(y_3)y_2^* & \phi(y_3)y_3^* & \phi(y_3)y_4^* \\ \phi(y_4)y_1^* & \phi(y_4)y_2^* & \phi(y_4)y_3^* & \phi(y_4)y_4^* \end{bmatrix} \right\} \right) W_{(4,4)_{i-1}} + W_{(4,4)_{i-1}} \qquad (6)$$

In the formula (6), the elements of the output signals y1(ω) to y4(ω) are complex signals of a frequency-domain. The matrix elements of the separation matrices W (4, 4)i and W(4, 4)i−1 are complex coefficients. In the formula (6), I represents a unit matrix of 4×4, ε {·} represents a time average, * represents a complex conjugate signal, and φ (·) represents a nonlinear function. As a nonlinear function, it is preferable to use a function which corresponds to a function obtained by differentiating a logarithm of a probability density function, and in general, tan h(·) is used. In the formula (6), α represents a step size parameter for controlling a learning speed, and i represents the number of times at which the learning is performed. The learning is performed by substituting W(4, 4)i on a right-hand side for W(4, 4)i−1 on a left-hand side. The matrix shown in the braces with ε is a high-order correlation function.

Here, the speakers S1 to S4 are all different from one another and are the sound sources which are independent of one another. Therefore, s1(ω) to s4(ω) in the formula (4) are independent of one another and are voices which have no correlation among one another. Two detection signals (m1 (ω), m2(ω)) are inputted, and the number of the detection signals corresponds to the number of the speakers (S1 and S2) on the near end. Two loudspeaker input signals (sp1(ω), sp2 (ω)) are inputted, and the number of these loudspeaker input signals corresponds to the number of the speakers (S3 and S4) on the far end. Accordingly, in a case where under these conditions, the learning section 102 learns the separation matrix W (4, 4) and the learning has converged, the separation matrix W (4, 4) becomes a matrix which can respectively separate s1(ω) to s4(ω) from the detection signals (m1(ω), m2(ω)) and the loudspeaker input signals (sp1(ω), sp2(ω)). In other words, in the output signal y1 which the separation section 101 calculates based on the separation matrix W (4, 4) in which the learning has converged, only s1(ω) included in the detection signals (m1(ω), m2(ω)) is included, and in the output signal y2, only s2(ω) included in the detection signals (m1(ω), m2(ω)) is included. Similarly, in the output signal y3, only s3(ω)) included in the loudspeaker input signals (sp1(ω), sp2(ω)) is included, and in the output signal y4, only s4(ω) included in the loudspeaker input signals (sp1(ω), sp2(ω)) is included.

In reality, as a sound from an independent sound source other than the speakers S1 and S2 on the near end, there is an environmental noise on the near end. This is the same as on the far end. However, this kind of the environmental noise is generally a signal having a distribution which is close to the Gaussian distribution as compared with a voice of a speaker. Therefore, in the learning using the formula (6), that is, the learning using the independent component analysis, the voice of a speaker, whose signal has a distribution not close to the Gaussian distribution is preferentially processed. In other words, since the learning section 102 targets s1(ω) to s4(ω) for the preferential processing, the separation matrix which can separate s1(ω) to s4(ω) respectively from the detection signals (m1(ω), m2(ω)) and the loudspeaker input signals (sp1(ω), sp2(ω)) is learned.

As described above, the learning section 102 learns the separation matrix W (4, 4) in accordance with the independent component analysis, whereby the separation section 101 can separate the near-end acoustic signals from the detection signals (m1(ω)), m2(ω)) as the output signals y1 and y2 and can separate the far-end acoustic signals from the loudspeaker input signals (sp1(ω), sp2(ω)) as output signals y3 and y4. The output signals y3 and y4 which are the far-end acoustic signals are not outputted from the sound source separation section 100 and are used only for the learning performed by the learning section 102.

Hereinunder, what kinds of signals the output signals y1 to y4 become will be described by using a formula (7). In the formula (7), the formula (4) is applied to the formula (5) and further, signals inputted to the separation section 101 are more specifically represented. Note that in the formula (7), the (ω) s shown in the formula (4) are omitted.

which is included in the detection signal m2, is added. Finally, the output signal y1 becomes a signal including only s1, being a signal which includes only the voice of the speaker S1. Similarly, the output signal y2 becomes a signal including only s2, being a signal which includes only the voice of the speaker S2. The output signal y3 becomes a signal including only s3, being a signal which includes only the voice of the speaker S3. The output signal y4 becomes a signal including only s4, being a signal which includes only the voice of the speaker S4.

Here, for example, in the output signal y1, in order to cancel, as echoes, the voices of the speakers S3 and S4 included in the detection signal m1, w13 is required to be −h11, which is obtained by multiplying, by a minus, the transfer characteristic h11 from the loudspeaker 10 to the microphone 11. And w14 is required to be −h21, which is obtained by multiplying, by a minus, the transfer characteristic h21 from the loudspeaker 20 to the microphone 11. Accordingly, it is understood that in the state where the learning of the separation matrix W (4, 4) has converged, even if the voices (s3, s4) which have correlations with the loudspeaker input signals (sp1, sp2) are included, the transfer characteristics h11 and h21 from the loudspeaker 10 and loudspeaker 20 to the microphone 11 are correctly estimated.

Note that among the respective matrix elements of the separation matrix W (4, 4), the elements (w11, w12, w21, w22) are relevant to the respective transfer characteristics from the speakers S1 and S2 on the near end to the microphones 11 and 21. The elements (w11, w12, w21, w22) are used to separate, as the output signals y1 and y2, the voice of the speaker S1 and the voice of the speaker S2, which are included in the detection signals (m1, m2). And the elements (w13, w14, w23, w24) are relevant to the respective transfer characteristics from the loudspeakers 10 and 20 on the near end to the microphones 11 and 21. The elements (w13, w14, w23, w24) are used to cancel the voice of the speaker S3 and the voice of the speaker S4, which are echo components, from the detection signals (m1, m2). And the elements (w33, w34, w43, w44) are relevant to the respective transfer characteristics from the speakers S3 and S4 on the far end to the microphones 31 and 41. The elements (w33, w34, w43, w44) are used to separate, as the output signals y3 and y4, the voice of the speaker S3 and the voice of the speaker S4, which are included in the loudspeaker input signals (sp1, sp2).

[Formula 7]

$$\begin{bmatrix} y_1 \\ y_2 \\ y_3 \\ y_4 \end{bmatrix} = \begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix} \begin{bmatrix} s1 \cdot a11 + s2 \cdot a21 + (s3 \cdot a31 + s4 \cdot a41) \cdot h11 + (s3 \cdot a32 + s4 \cdot a42) \cdot h21 \\ s1 \cdot a12 + s2 \cdot a22 + (s3 \cdot a31 + s4 \cdot a41) \cdot h12 + (s3 \cdot a32 + s4 \cdot a42) \cdot h22 \\ s3 \cdot a31 + s4 \cdot a41 \\ s3 \cdot a32 + s4 \cdot a42 \end{bmatrix} \quad (7)$$

In a state where the learning of the separation matrix W (4, 4) has converged, in the output signal y1 outputted from the separation section 101, voices (s3·a31, s3·a32, s4·a41, s4·a42) of the speakers S3 and S4, which are included in the detection signal m1, are cancelled as echoes; a voice of (s2·a21) of the speaker S2, which is included in the detection signal m1, is cancelled; and a voice (s1·a12) of the speaker S1, As described above, in the present embodiment, the sound source separation section 100, by canceling the far-end acoustic signal included in the detection signals (m1, m2), separates the near-end acoustic signal and the far-end acoustic signal which are included in the detection signals (m1, m2). And the sound source separation section 100 outputs only the separated near-end acoustic signal as the output signals y1 and y2. Thus, regardless of whether or not voices which correlate with the loudspeaker input signals (sp1, sp2) are included, the far-end acoustic signal included in the detection signals (m1, m2) can be cancelled as an echo. As a result, the present embodiment enables invariably stable echo cancellation in the multichannel reproduction while solving the problem of the inconstant solutions, without deteriorating sound quality.

In addition, since the present embodiment does not use the conventional adaptive filter, regardless of which is performed, a double talk or a single talk, the estimation of correct transfer characteristics is enabled.

Although in the above description, the voices themselves of the speakers S1 and S2 are included, as the near-end acoustic signals, in the output signals y1 and y2 from the sound source separation section 100, the present invention is not limited thereto. In the output signals y1 and y2, statistics which indicate characteristics of the voices of the speakers S1 and S 2 may be included as the near-end acoustic signals. In other words, the near-end acoustic signals may be acoustic signals which are statistics indicating the characteristics of the voices of the speakers S1 and S2, instead of the voices of the speakers S1 and S2.

In addition, although the processing in the case of the double talk is described, needless to say, also in a single talk (when only the speakers S3 and S4 converse), the echo cancellation is carried out by performing the same processing as in the double talk. Note that in the single talk, since the voices of the speakers S1 and S2 are not included in the detection signals (m1, m2), the sound source separation section 100 outputs the output signals y1 and y2 as silent signals. In reality, environmental noises or the like on the near end, which are sounds from sound sources independent from the speakers S3 and S4, are outputted as the silent signals.

In addition, although in the above description, the two speakers S1 and S2 are present on the near end, the present invention is not limited thereto. The number of speakers present on the near end may be one, or three or more.

First, as a case where the number of speakers present on the near end is one, for example, a case where only the speaker S1 is present will be described. The sound source separation section 100 separates the near-end acoustic signals whose number corresponds to the number of the inputted detection signals detected by the microphones. In the present embodiment, the number of the inputted detection signals detected by the microphones is two, i.e., m1 and m2. Accordingly, in this case, the sound source separation section 100 outputs the output signal y1 as a signal which includes only the voice of the speaker S1 and the output signal y2 as a silent signal which includes only an environmental noise on the near end. Note that in this case, since the voice of the speaker S1 and the environmental noise are independent of each other, the output signal y1 including only the voice of the speaker S1 and the output signal y2 including only the environmental noise are independent of each other. The output signals y1 and y2 are independent from the output signals y3 and y4. Accordingly, even in this case, the sound source separation section 100 is capable of separating, from the inputted signals, the output signals y1 to y4 which are independent of one another, and is capable of separating the near-end acoustic signal and the far-end acoustic signal which are included in the detection signals (m1, m2).

Next, as a case where the number of speakers present on the near end is three, for example, a case where a speaker S5 is further present will be described. In this case, for example, if the speaker S5 is present in the vicinity of the speaker S1, the sound source separation section 100 outputs the output signal y1 as a signal which includes only voices of the speakers S1 and S5 and outputs the output signal y2 as a signal which includes only a voice of the speaker S2. If the speaker S5 is present in the vicinity of the speaker S1, a transfer characteristic from the speaker S1 to the microphone 11 approximates to a transfer characteristic from the speaker S5 to the microphone 11 and a transfer characteristic from the speaker S1 to the microphone 21 approximates to a transfer characteristic from the speaker S5 to the microphone 21. Therefore, the voice of the speaker S5 is included in the output signal y1 which includes the voice of the speaker S1, whose transfer characteristic approximates to that of the speaker S5. In this case, since the voices of the speakers S1, S2, and S5 are independent of one another, the output signal y1 which includes only the voices of the speakers S1 and S5 and the output signal y2 which includes only the voice of the speaker S2 are independent of each other. The output signals y1 and y2 are independent from the output signals y3 and y4. Accordingly, the sound source separation section 100 is capable of separating, from the inputted signals, the output signals y1 to y4 which are independent of one another, and is capable of separating the near-end acoustic signal and the far-end acoustic signal which are included in the detection signals (m1, m2).

In addition, although in the above description, the two speakers S3 and S4 are present on the far end, the present invention is not limited thereto. The number of speakers present on the far end may be one, or three or more.

First, as a case where the number of speakers present on the far end is one, for example, a case where only the speaker S3 is present will be described. The sound source separation section 100 separates the far-end acoustic signals whose number corresponds to the number of the inputted loudspeaker input signals. In the present embodiment, the number of the inputted loudspeaker input signals is two, i.e., sp1 and sp2. Accordingly, in this case, the sound source separation section 100 outputs the output signal y3 as a signal which includes only the voice of the speaker S3 and the output signal y4 as a silent signal which includes only an environmental noise on the far end. Note that in this case, since the voice of the speaker S3 and the environmental noise are independent of each other, the output signal y3 including only the voice of the speaker S3 and the output signal y4 including only the environmental noise are independent of each other. The output signals y1 and y2 are independent from the output signals y3 and y4. Accordingly, even in this case, the sound source separation section 100 is capable of separating, from the inputted signals, the output signals y1 to y4 which are independent of one another, and is capable of separating the near-end acoustic signal and the far-end acoustic signal which are included in the detection signals (m1, m2).

Next, as a case where the number of speakers present on the far end is three, for example, a case where a speaker S6 is further present will be described. In this case, for example, if the speaker S6 is present in the vicinity of the speaker S3, the sound source separation section 100 outputs the output signal y3 as a signal which includes only voices of the speakers S3 and S6 and outputs the output signal y4 as a signal which includes only a voice of the speaker S4. If the speaker S6 is present in the vicinity of the speaker S3, a transfer characteristic from the speaker S3 to the microphone 31 approximates to a transfer characteristic from the speaker S6 to the microphone 31 and a transfer characteristic from the speaker S3 to the microphone 41 approximates to a transfer characteristic from the speaker S6 to the microphone 41. Therefore, the voice of the speaker S6 is included in the output signal y3 which includes the voice of the speaker S3, whose transfer characteristic approximates to that of the speaker S6. In this case, since the voices of the speakers S3, S4, and S6 are independent of one another, the output signal y3 which includes only the voices of the speakers S3 and S6 and the output signal y4 which includes only the voice of the speaker S4 are independent of each other. The output signals y1 and y2 are independent from the output signals y3 and y4. Accordingly, the sound source separation section 100 is capable of separating, from the inputted signals, the output signals y1 to y4 which are independent of one another, and is capable of separating the near-end acoustic signal and the far-end acoustic signal which are included in the detection signals (m1, m2).

In the acoustic system shown in FIG. 1, as one example, the multichannel echo canceller according to the present embodiment is provided only on the near end. However, needless to say, the multichannel echo canceller may be also provided on the far end.

Second Embodiment

Figure 3:
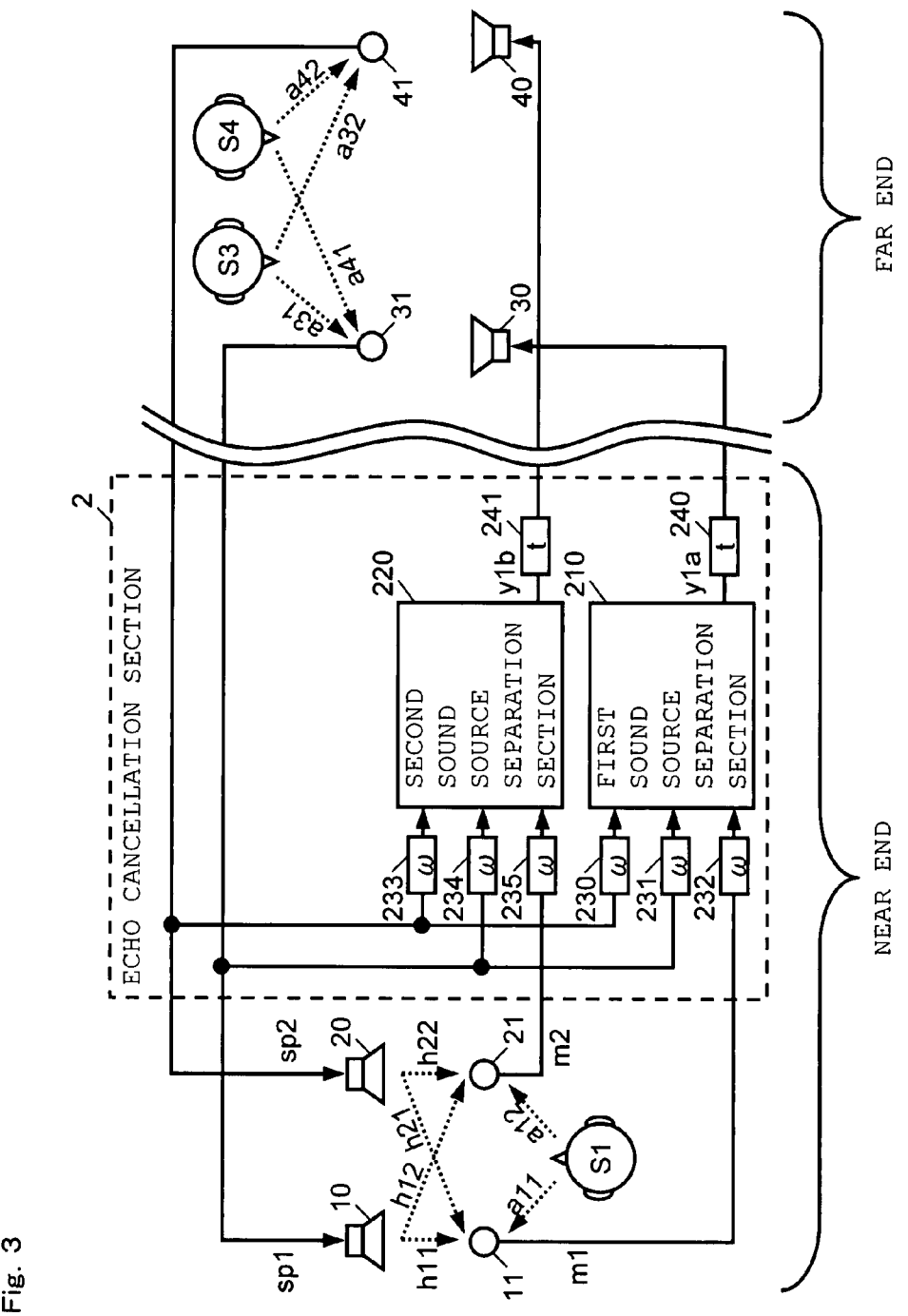
FIG. 3 is a diagram illustrating an exemplary configuration of the multichannel echo canceller according to the first embodiment, which is used in an acoustic system.

With reference to FIG. 3, a configuration of a multichannel echo canceller according to a second embodiment of the present invention will be described. FIG. 3 is a diagram illustrating an exemplary configuration of the multichannel echo canceller according to the second embodiment, which is used in an acoustic system. In an acoustic system shown in FIG. 3, it is assumed that on a near end, a speaker S1 is present as a sound source (near-end sound source) and on a far end, speakers S3 and S4 are present as a plurality of sound sources which are different from each other (far-end sound sources). On the near end, loudspeakers 10 and 20 for amplifying far-end acoustic signals of voices of the speakers S3 and S4 on the far end and microphone 11 and 21 for detecting a near-end acoustic signal of a voice of the speakers S1 on the near end are provided. On the far end, loudspeaker 30 and 40 for amplifying near-end acoustic signals and microphones 31 and 41 for detecting far-end acoustic signals are provided. The loudspeakers (10, 20, 30, and 40) and the microphones (11, 21, 31, and 41) are the same as those described with reference to FIG. 8 and the same reference numerals are used. In the acoustic system shown in FIG. 3, as one example, it is assumed that the multichannel echo canceller according to the present embodiment is provided only on the near end. In the acoustic system shown in FIG. 3, as one example, it is also assumed that the so-called double talk, in which the speaker S1 on the near end simultaneously converse with the speakers S3 and S4 on the far end, is carried out.

In FIG. 3, the multichannel echo canceller according to the present embodiment includes an echo cancellation section 2. The echo cancellation section 2 includes a first sound source separation section 210, a second sound source separation section 220, conversion sections 230 to 235, and reverse conversion sections 240 and 241.

In the echo cancellation section 1 according to the above-described first embodiment, one sound source separation section 100 is provided for the microphones 11 and 21. In contrast to this, in the echo cancellation section 2 according to the present embodiment, the first sound source separation section 210 and the second sound source separation section 220 are provided so as to correspond to the microphone 11 and the microphone 21, respectively. In other words, in the configuration of the present embodiment, one sound source separation section is provided for one microphone on the near end. Although the conversion sections 230 to 235 operate in the same manner as the conversion sections 110 to 113 in the echo cancellation section 1, reference numerals thereof are changed in FIG. 3 for convenience sake. Although the reverse conversion sections 240 and 241 operate in the same manner as the reverse conversion section 120 and 121 in the echo cancellation section 1, reference numerals thereof are changed for convenience sake. Hereinunder, points which are different from the first embodiment will be mainly described.

The first sound source separation section 210 receives a loudspeaker input signal $sp2(\omega)$ which has been converted to a frequency-domain signal ($\omega$) in the conversion section 230; a loudspeaker input signal $sp1(\omega)$ which has been converted to a frequency-domain signal ($\omega$) in the conversion section 231; and a detection signal $m1(\omega)$ which has been converted to a frequency-domain signal ($\omega$) in the conversion section 232. The first sound source separation section 210 subjects the inputted signals to sound source separation processing based on an independent component analysis. Through this sound source separation processing, a near-end acoustic signal and a far-end acoustic signal which are included in the detection signal $m1(\omega)$ are separated. Although the sound source separation processing based on the independent component analysis is substantially similar to that in the first embodiment, details thereof will be described later. The first sound source separation section 210 outputs only the separated near-end acoustic signal as an output signal $y1a$ ( ). Here, the far-end acoustic signal corresponds to an echo. Accordingly, only the near-end acoustic signal is outputted from the first sound source separation section 210, thereby making it possible to cancel the far-end acoustic signal included in the detection signal $m1(\omega)$ as an echo. The output signal $y1a(\omega)$ outputted from the first sound source separation section 210 is converted to a time-domain signal (t) in the reverse conversion section 240. The output signal $y1a$ (t) which has been converted to the time-domain signal (t) is outputted to the loudspeaker 30 and amplified by the loudspeaker 30.

The second sound source separation section 220 receives a loudspeaker input signal $sp2(\omega)$ which has been converted to a frequency-domain signal ($\omega$) in the conversion section 233; a loudspeaker input signal $sp1(\omega)$ which has been converted to a frequency-domain signal ($\omega$) in the conversion section 234; and a detection signal $m2(\omega)$ which has been converted to a frequency-domain signal ($\omega$) in the conversion section 235. The second sound source separation section 220 subjects the inputted signals to the sound source separation processing based on the independent component analysis. Through this sound source separation processing, a near-end acoustic signal and a far-end acoustic signal which are included in the detection signal $m2(\omega)$ are separated. The sound source separation processing based on the independent component analysis is the same as that performed in the first sound source separation section 210. The second sound source separation section 220 outputs only the separated near-end acoustic signal as an output signal $y1b(\omega)$. Here, the far-end acoustic signal corresponds to an echo. Accordingly, only the near-end acoustic signal is outputted from the second sound source separation section 220, thereby making it possible to cancel the far-end acoustic signal included in the detection signal $m2(\omega)$ as an echo. The output signal $1b(\omega)$ outputted from the second sound source separation section 220 is converted to a time-domain signal (t) in the reverse conversion section 241. The output signal $1b$(t) which has been converted to the time-domain signal (t) is outputted to the loudspeaker 40 and amplified by the loudspeaker 40.

Hereinunder, the sound source separation processing based on the independent component analysis, which is performed in the first and second sound source separation sections 210 and 220, will be described in detail. Here, as one example, the first sound source separation section 210 is used in the description. First, the detection signal m1(ω) and the loudspeaker input signals (sp1(ω), sp2(ω)) which are inputted to the first sound source separation section 210 will be described in detail. The detection signal m1(ω) and the loudspeaker input signals (sp1(ω), sp2(ω)) are represented as in a formula (8).

[Formula 8]

$$m1(w)=s1(w)\cdot a11(w)+sp1(w)\cdot h11(w)+sp2(w)\cdot h21(w)$$

$$sp1(w)=s3(w)\cdot a31(w)+s4(w)\cdot a41(w)$$

$$sp2(w)=s3(w)\cdot a32(w)+s4(w)\cdot a42(w) \quad (8)$$

In the formula (8), a voice of the speaker S1 is s1(ω), a voice of the speaker S3 is s3(ω), and a voice of the speaker S4 is s4(ω). A transfer characteristic from the speaker S1 to the microphone 11 is a11(ω); a transfer characteristic from the speaker S1 to the microphone 21 is a12(ω); a transfer characteristic from the speaker S3 to the microphone 31 is a31(ω); a transfer characteristic from the speaker S3 to the microphone 41 is a32(ω); a transfer characteristic from the speaker S4 to the microphone 31 is a41(ω); and a transfer characteristic from the speaker S4 to the microphone 41 is a42(ω).

Figure 4:
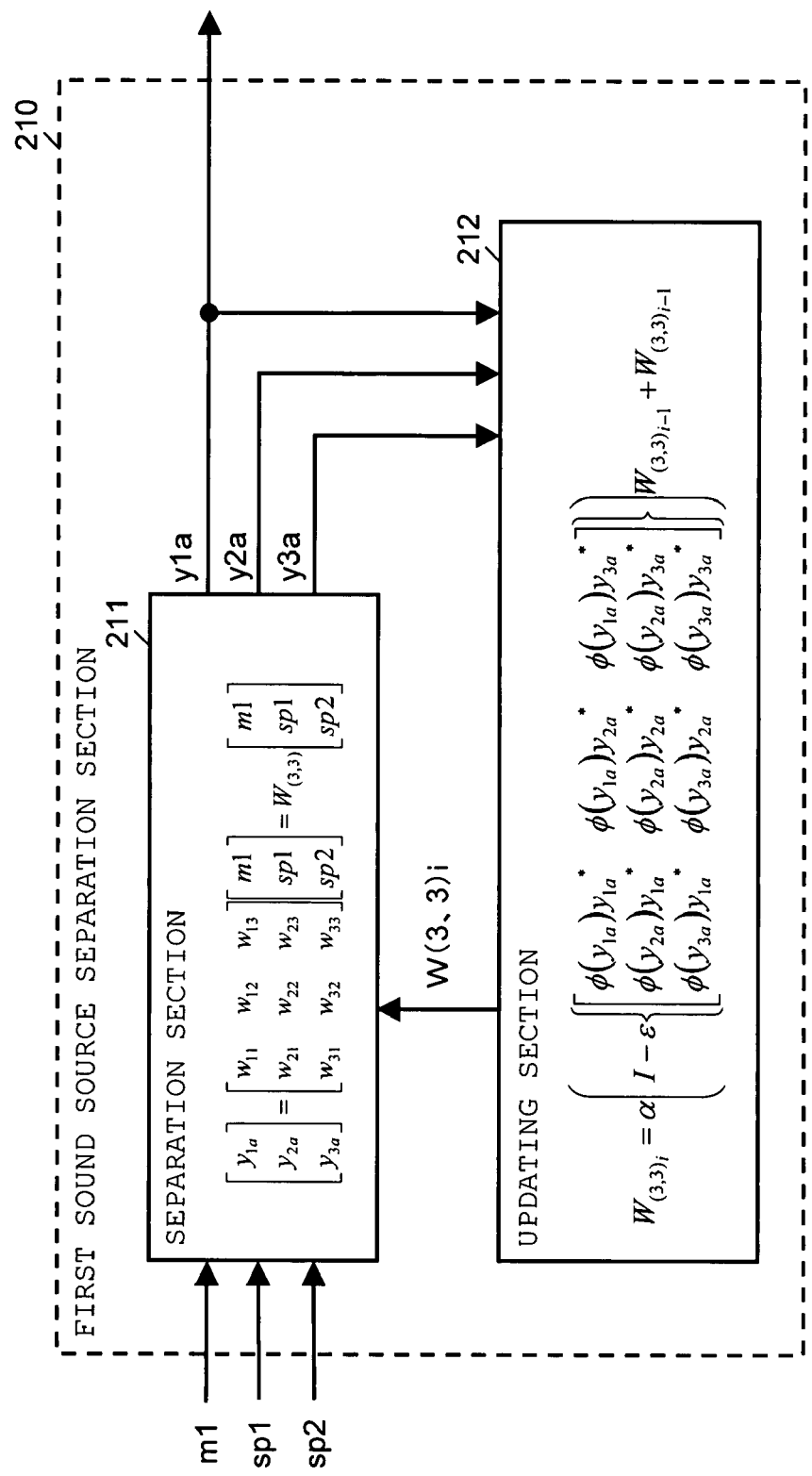
FIG. 4 is a diagram illustrating a detailed configuration of a first sound source separation section 210.

Next, with reference to FIG. 4, a detailed configuration of the first sound source separation section 210 will be described. FIG. 4 is a diagram illustrating the detailed configuration of the first sound source separation section 210. In FIG. 4, the first sound source separation section 210 includes a separation section 211 and a learning section 212.

In the separation section 211, a separation matrix W (3, 3) with matrix elements wij (the number of rows i and the number of columns j are integers 1 through 3) is set. It is assumed that in an initial state, for example, a separation matrix W (3, 3) is set as a unit matrix. The detection signal m1(ω) and the loudspeaker input signals (sp1(ω), sp2(ω)) are inputted to the separation section 211. The separation section 211 respectively calculates the output signals y1a to y3a using a formula (9) based on the set separation matrix W (3, 3) and respectively outputs the calculated output signals y1a to y3a. Specifically, as shown in the formula (9), the separation section 211 calculates an output vector including the output signals y1a to y3a by multiplying an input vector including the detection signal m1(ω) and the loudspeaker input signals (sp1(ω), sp2(ω)) by the set separation matrix W (3, 3).

[Formula 9]

$$\begin{bmatrix} y_{1a} \\ y_{2a} \\ y_{3a} \end{bmatrix} = \begin{bmatrix} w_{11} & w_{12} & w_{13} \\ w_{21} & w_{22} & w_{23} \\ w_{31} & w_{32} & w_{33} \end{bmatrix} \begin{bmatrix} m1 \\ sp1 \\ sp2 \end{bmatrix} = W_{(3,3)} \begin{bmatrix} m1 \\ sp1 \\ sp2 \end{bmatrix} \quad (9)$$

The learning section 212 receives the output signals y1a (ω) to y3a(ω) and in accordance with the independent component analysis, learns the separation matrix W (3, 3). Specifically, the learning section 212 learns the separation matrix W (3, 3) such that the output signals y1a (ω) to y3a (ω) become independent of one another. The learning section 212 updates the separation matrix W (3, 3), which has been set in the separation section 211, to the learned separation matrix W (3, 3).

Hereinunder, a learning method of the learning section 212 will be more specifically described. A formula (10) is a learning formula which is generally used for an independent component analysis of a frequency-domain, in which a gradient method is used. Note that as in the first embodiment, a learning formula used for the independent component analysis is not limited to the formula (10) and other learning formulae may be used.

[Formula 10]

$$W_{(3,3)_i} = \alpha \left( I - \varepsilon \left\{ \begin{bmatrix} \phi(y_{1a})y_{1a}^* & \phi(y_{1a})y_{2a}^* & \phi(y_{1a})y_{3a}^* \\ \phi(y_{2a})y_{1a}^* & \phi(y_{2a})y_{2a}^* & \phi(y_{2a})y_{3a}^* \\ \phi(y_{3a})y_{1a}^* & \phi(y_{3a})y_{2a}^* & \phi(y_{3a})y_{3a}^* \end{bmatrix} \right\} \right) W_{(3,3)_{i-1}} + W_{(3,3)_{i-1}} \quad (10)$$

In the formula (10), the elements of the output signals y1a(ω) to y3a (ω) are complex signals of a frequency-domain. The matrix elements of the separation matrices W (3, 3)i and W(3, 3)i−1 are complex coefficients. In the formula (10), I represents a unit matrix 3×3, ε {·} represents a time average, * represents a complex conjugate signal, and φ (·) represents a nonlinear function. As a nonlinear function, it is preferable to use a function which corresponds to a function obtained by differentiating a logarithm of a probability density function, and in general, tan h(·) is used. In the formula (10), α represents a step size parameter for controlling a learning speed, and i represents the number of times at which the learning is performed. The learning is performed by substituting W(3, 3)i on a right-hand side for W(3, 3)i−1 on a left-hand side. The matrix shown in the braces with ε is a high-order correlation function.

Here, the speakers S1, S3, and S4 are all different from one another and are the sound sources which are independent of one another. Therefore, s1(ω), s3(ω), and s4(ω) in the formula (8) are independent of one another and are voices which have no correlation among one another. One detection signal m1(ω) is inputted, and the number of the detection signal corresponds to the number of the speaker S1 on the near end. Two loudspeaker input signals (sp1(ω), sp2(ω)) are inputted, and the number of these loudspeaker input signals corresponds to the number of speakers (S3 and S4) on the far end. Accordingly, in a case where under these conditions, the learning section 212 learns the separation matrix W (3, 3) and the learning has converged, the separation matrix W (3, 3) becomes a matrix which can respectively separate s1(ω), s3(ω), and s4(ω) from the detection signal m1(ω) and the loudspeaker input signals (sp1(ω), sp2(ω)). In other words, in the output signal y1a which the separation section 211 calculates based on the separation matrix W (3, 3) in which the learning has converged, only s1(ω) included in the detection signal m1(ω) is included, and in the output signal y2a, only s2(ω) included in the detection signal m1(ω) is included. Similarly, in the output signal y2a, only s3(ω) included in the loudspeaker input signals (sp1(ω), sp2(ω)) is included, and in the output signal y3a, only s4(ω) included in the loudspeaker input signals (sp1(ω), sp2(ω)) is included.

As described above, the learning section 212 learns the separation matrix W (3, 3) in accordance with the independent component analysis, whereby the separation section 211 can separate the near-end acoustic signal from the detection signals m1(ω) as the output signals y1a and can separate the far-end acoustic signals from the loudspeaker input signals (sp1(ω), sp2(ω)) as output signals y2a and y3a. The output signals y2a and y3a which are the far-end acoustic signals are not outputted from the sound source separation section 210 and are used only for the learning performed by the learning section 212.

In the second sound source separation section 220, the same sound source separation processing as in the first sound source separation section 210 is performed. Thus, an output signal 1b including only s1(ω) included in the detection signal m2(ω) is outputted from the second sound source separation section 220.

Hereinunder, what kinds of signals the output signals y1a to y3a become will be described by using a formula (11). In the formula (11), the formula (8) is applied to the formula (9) and further, signals inputted to the separation section 211 are more specifically represented. Note that in the formula (11), the (ω)s shown in the formula (8) are omitted.

[Formula 11]

$$\begin{bmatrix} y_{1a} \\ y_{2a} \\ y_{3a} \end{bmatrix} = \begin{bmatrix} w_{11} & w_{12} & w_{13} \\ w_{21} & w_{22} & w_{23} \\ w_{31} & w_{32} & w_{33} \end{bmatrix} \begin{bmatrix} s1 \cdot a11 + (s3 \cdot a31 + s4 \cdot a41) \cdot h11 + (s3 \cdot a32 + s4 \cdot a42) \cdot h21 \\ s3 \cdot a31 + s4 \cdot a41 \\ s3 \cdot a32 + s4 \cdot a42 \end{bmatrix} \quad (11)$$

In a state where the learning of the separation matrix W (3, 3) has converged, w11=γ (γ is an arbitrary real number), w12=−h11γ, and w13=−h21γ result, and finally, as the output signal y1a, y1a=s1·a11 results. In other words, in the output signal y1a, voices(s3·a31, s3·a32, s4·a41, s4·a42) of the speakers S3 and S4, which are included in the detection signal m1, are cancelled as echoes. Also in the state where the learning of the separation matrix W (3, 3) has converged, w21=w31=0 results, and matrix elements (w22, w23, w32, w33) are transfer characteristics which can separate s3(ω) and s4(ω). Thus, finally, the output signal y2a becomes a signal which includes only s3 and the output signal y3a becomes a signal which includes only s4. As described above, it is understood that in the state where the learning of the separation matrix W (3, 3) has converged, even if the voices (s3, s4) which have correlations with the loudspeaker input signals (sp1, sp2) are included, the transfer characteristics h11 and h21 from the loudspeaker 10 and loudspeaker 20 to the microphone 11 are correctly estimated.

Note that among the respective matrix elements of the separation matrix W (3, 3) which has converged, the element (w11) is relevant to the transfer characteristic from the speakers S1 on the near end to the microphones 11. The element (w11) is used to provide a signal level of s1·a11. The elements (w12, w13) are relevant to the transfer characteristics from the loudspeakers 10 and 20 on the near end to the microphone 11. The elements (w12, w13) are used to cancel, from the detection signal m1, the voices of the speakers S3 and S4, which are echo components. The elements (w22, w23, w32, w33) are relevant to the transfer characteristics from the speakers S3 and S4 to the microphones 31 and 41. The elements (w22, w23, w32, w33) are used to separate, as the output signals y2a and y3a, the voices of the speakers S3 and S4, which are included in the loudspeaker input signals (sp1, sp2). The elements (w21, w31) are used to separate, as the one output signals y2a and y3a, the voices of the speakers S3 and S4, which are included in the loudspeaker input signals (sp1, sp2) by using the detection signal m1.

As described above, in the present embodiment, the first sound source separation section 210 separates the near-end acoustic signal and the far-end acoustic signal which are included in the detection signal m1, and outputs only the separated near-end acoustic signal as the output signal y1a. The second sound source separation section 220 separates the near-end acoustic signal and the far-end acoustic signal which are included in the detection signal m2, and outputs only the separated near-end acoustic signal as the output signals y1b. Thus, regardless of whether or not voices which correlate with the loudspeaker input signals (sp1, sp2) are included, the far-end acoustic signal included in the detection signals (m1, m2) can be cancelled as an echo. As a result, the present embodiment enables invariably stable echo cancellation in the multichannel reproduction while solving the problem of the inconstant solutions, without deteriorating sound quality.

In addition, since the present embodiment does not use the conventional adaptive filter, regardless of which is performed, a double talk or a single talk, the estimation of correct transfer characteristics is enabled.

In the present embodiment, the first sound source separation section 210 and the second sound source separation section 220 are provided so as to correspond to the microphone 11 and the microphone 21, respectively. Therefore, the output signal y1a including only the voice s1 of the speaker S1, which is included in the detection signal m1 is outputted from the first sound source separation section 210 and the output signal y1b including only the voice s1 of the speaker S1, which is included in the detection signal m2, is outputted from the second sound source separation section 220. Since the output signal y1a includes only the voice s1 of the speaker S1, which is included in the detection signal m1, the output signal y1a becomes a signal having a sense of direction from the speaker S1 toward the microphone 11. Similarly, since the output signal y1b includes only the voice s1 of the speaker S1, which is included in the detection signal m2, the output signal y1b becomes a signal having a sense of direction from the speaker S1 toward the microphone 21. Accordingly, when these output signals y1a and y1b are amplified by the loudspeakers 30 and 40 on the far end, the speakers S3 and S4 can feel a sense of direction from the amplified voice of the speaker S1.

Although in the above description, the processing in the case of the double talk is described, needless to say, also in a single talk (when only the speakers S3 and S4 converse), the echo cancellation is carried out by performing the same processing as in the double talk. Note that in the single talk, since the voice of the speaker S1 is not included in the detection signal m1, the first sound source separation section 210 outputs the output signal y1a as a silent signal. In reality, environmental noises or the like on the near end, which are sounds from sound sources independent from the speakers S3 and S4, are outputted as the silent signals.

In addition, although in the above description, the one speaker S1 is present on the near end, the present invention is not limited thereto. The number of speakers present on the near end may be two or more.

First, as a case where the number of speakers present on the near end is two, for example, a case where the speaker S2 is further present will be described. The first sound source separation section 210 and the second sound separation section 220 separate the near-end acoustic signals whose number corresponds to the number of the inputted detection signals detected by the microphones. In the present embodiment, one detection signal, i.e. m1, which is detected by the microphones, is inputted to the first sound source separation section 210 and one detection signal, i.e. m2, which is detected by the microphones, is inputted to the second sound source separation section 220. Accordingly, in this case, the output signal y1a including only the voices of the speakers S1 and S2, which are included in the detection signal m1, is outputted from the first sound source separation section 210 and the output signal y1b including only the voices of the speakers S1 and S2, which are included in the detection signal m2, is outputted from the second sound source separation section 220. Note that in this case, since the voices of the speakers S1 to S4 are independent of one another, the output signal y1a including only the voices of the speakers S1 and S2, the output signal y2a including only the voice of the speaker S3, and the output signal y3a including only the voice of the speaker S4 are independent of one another. Accordingly, the first sound source separation section 210 is capable of separating, from the inputted signals, the output signals y1a to y3a which are independent of one another and is capable of separating the near-end acoustic signal and the far-end acoustic signal which are included in the detection signal m1. These separations are performed by the second sound source separation section 220 in the same manner.

In addition, although in the above description, the two speakers S3 and S4 are present on the far end, the present invention is not limited thereto. The number of speakers present on the far end may be three or more. Since this case is the same as in the above-described first embodiment, the description on this case will be omitted.

Figure 5:
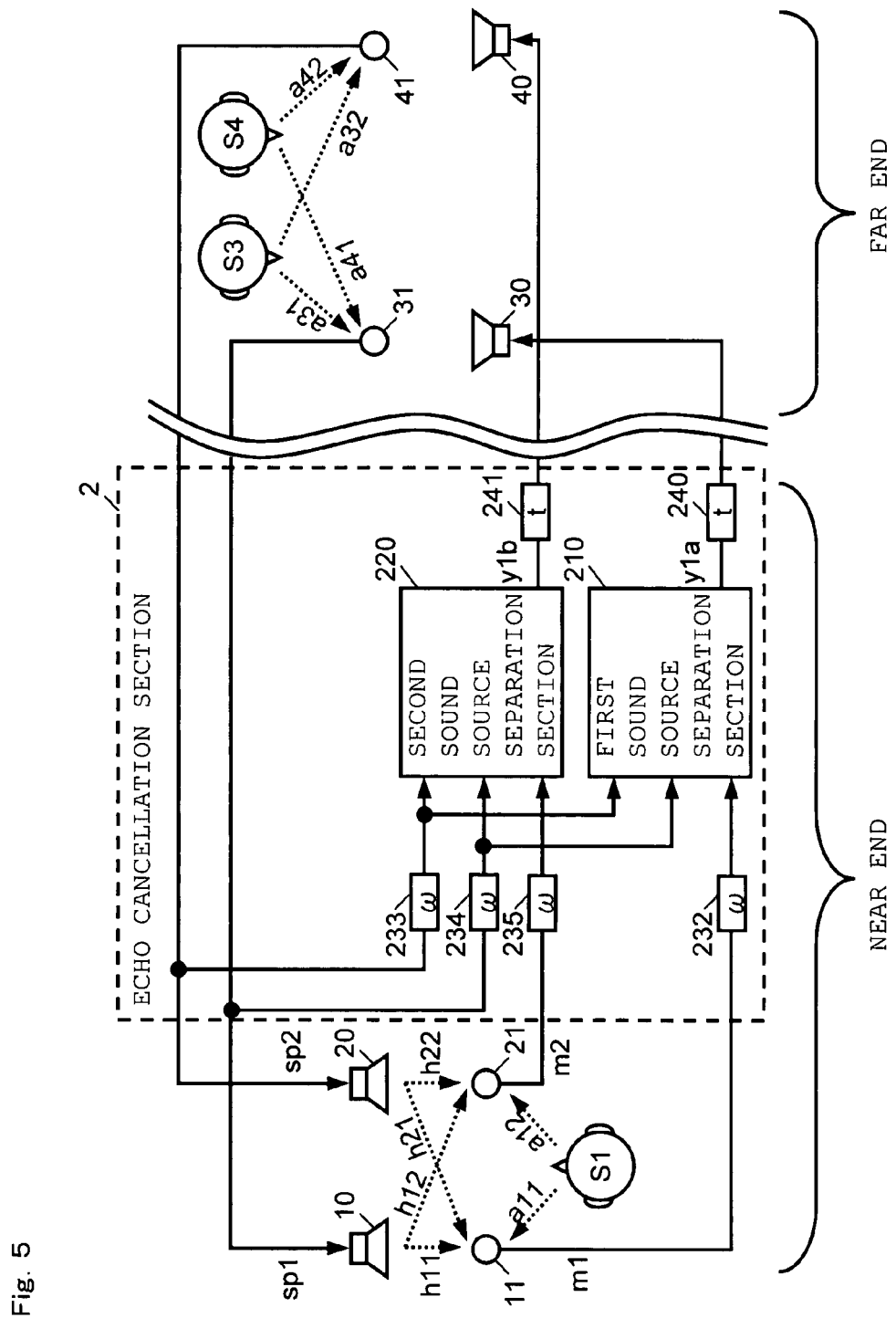
FIG. 5 is a diagram illustrating a case where conversion sections are partly shared.

In the above description, each of the conversion sections 230 to 235 is respectively provided so as to correspond to each of the respective signals inputted to the first sound source separation section 210 and the second sound source separation section 220 in a one-to-one corresponding manner. However, as shown in FIG. 5, the conversion sections may be partly shared. FIG. 5 is a diagram illustrating a case where the conversion sections are partly shared. In FIG. 5, the conversion section 233 converts the loudspeaker input signal sp2 to a frequency-domain signal (ω) and outputs the signal to the first sound source separation section 210 and the second sound source separation section 220. The conversion section 234 converts the loudspeaker input signal sp1 to a frequency-domain signal (ω) and outputs the signal to the first sound source separation section 210 and the second sound source separation section 220. In such a manner, the first sound source separation section 210 and the second sound source separation section 220 commonly use the conversion sections 233 and 234. Through using the conversion sections in a shared manner, an overall amount of processing in the multichannel echo canceller can be reduced.

In the acoustic system shown in FIG. 3, as one example, the multichannel echo canceller according to the present embodiment is provided only on the near end. However, needless to say, the multichannel echo canceller may be also provided on the far end.

Third Embodiment

Figure 6:
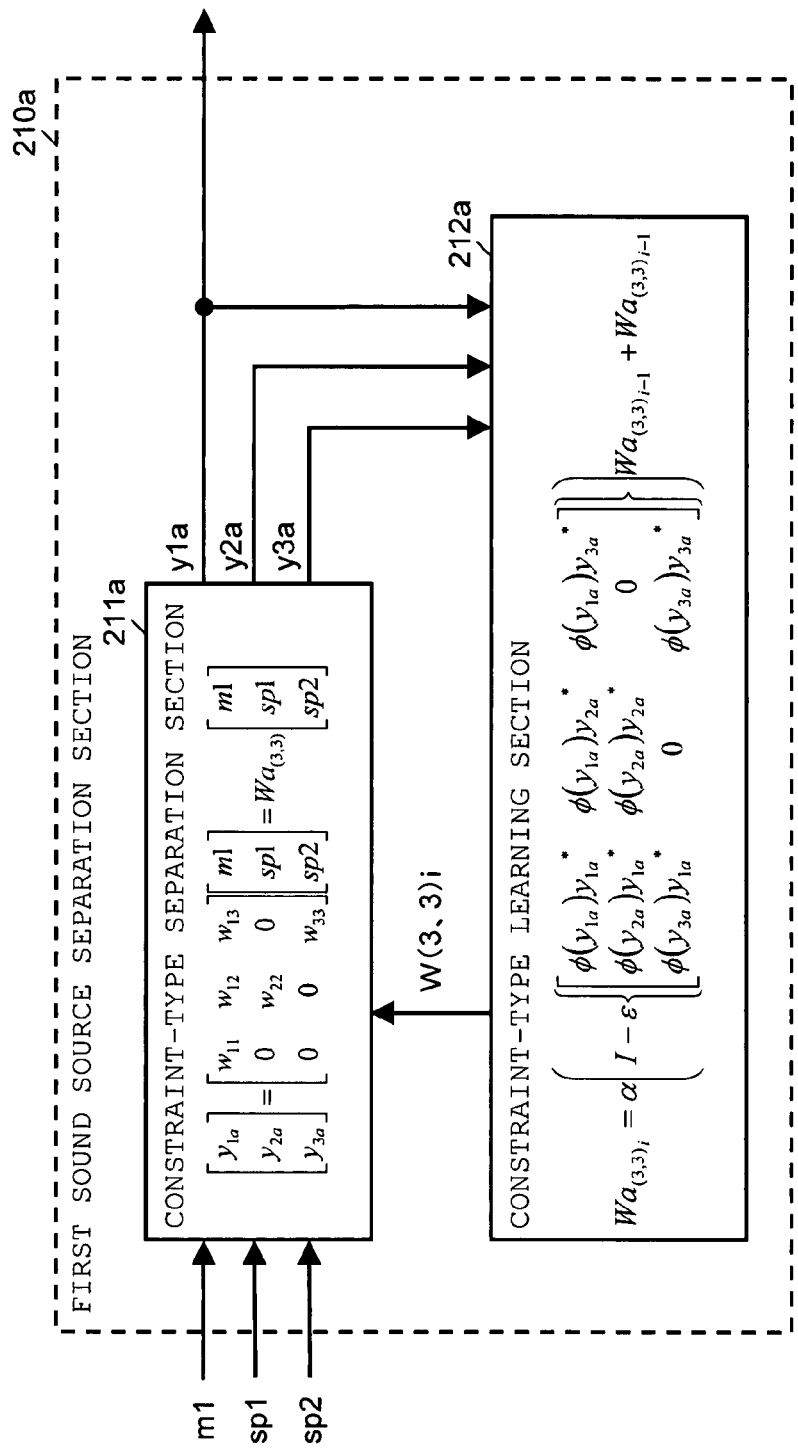
FIG. 6 is a diagram illustrating a configuration of a first sound source separation section 210a in which a part of the separation matrix, which is set in the first sound source separation section 210, is constrained.

In the above-described first sound source separation section 210 and second sound source separation section 220, all the matrix elements of the separation matrices are updated. In contrast to this, the matrix elements of the separation matrices may be partly constrained (the matrix elements are partly set to be zero). Hereinunder, with reference to FIG. 6, as a third embodiment, a case where the matrix elements of the separation matrices of the first sound source separation section 210 and the second sound source separation section 220 are partly constrained will be described. FIG. 6 is a diagram illustrating a configuration of a first sound source separation section 210a, in which configuration a part of the separation matrix set in the first sound source separation section 210 is constrained.

In FIG. 6, the first sound source separation section 210a includes a constraint-type separation section 211a and a constraint-type learning section 212a. In the constraint-type separation section 211a, a separation matrix Wa (3, 3) with matrix elements wij (the number of rows i and the number of columns j are integers 1 through 3) is set. It is assumed that in an initial state, for example, the separation matrix Wa (3, 3) is set as a unit matrix. A detection signal m1(ω) and loudspeaker input signals (sp1(ω), sp2(ω)) are inputted to the constraint-type separation section 211a. The constraint-type separation section 211a respectively calculates output signals y1a to y3a using a formula (12) based on the set separation matrix Wa (3, 3) and respectively outputs the calculated output signals y1a to y3a. Specifically, as shown in the formula (12), the constraint-type separation section 211a calculates an output vector including the output signals y1a to y3a by multiplying an input vector including the detection signal m1(ω) and the loudspeaker input signals (sp1(ω), sp2(ω)) by the set separation matrix Wa (3, 3).

[Formula 12]

$$\begin{bmatrix} y_{1a} \\ y_{2a} \\ y_{3a} \end{bmatrix} = \begin{bmatrix} w_{11} & w_{12} & w_{13} \\ 0 & w_{22} & 0 \\ 0 & 0 & w_{33} \end{bmatrix} \begin{bmatrix} m1 \\ sp1 \\ sp2 \end{bmatrix} = Wa_{(3,3)} \begin{bmatrix} m1 \\ sp1 \\ sp2 \end{bmatrix} \quad (12)$$

In the separation matrix Wa (3, 3) shown in the formula (12), the matrix elements (w21, w31) and (w23, w32) are, being zero, constrained. Among the output signal y1a (ω) to y3a(ω) outputted from the constraint-type separation section 211a, only the output signal y1a(ω) which is a near-end acoustic signal is outputted from the first sound source separation section 210a.

The constraint-type learning section 212a receives the output signals y1a (ω) to y3a (ω) and by conducting an independent component analysis, learns the separation matrix Wa (3, 3) which is set in the constraint-type separation section 211a. Specifically, the constraint-type learning section 212a learns the separation matrix Wa (3, 3) by using a formula (13). The constraint-type learning section 212a updates the separation matrix Wa (3, 3), which is set in the constraint-type separation section 211a, to the learned separation matrix Wa (3, 3).

[Formula 13]

$$Wa_{(3,3)_i} = \alpha \left( I - \varepsilon \left\{ \begin{bmatrix} \phi(y_{1a})y_{1a}^* & \phi(y_{1a})y_{2a}^* & \phi(y_{1a})y_{3a}^* \\ \phi(y_{2a})y_{1a}^* & \phi(y_{2a})y_{2a}^* & 0 \\ \phi(y_{3a})y_{1a}^* & 0 & \phi(y_{3a})y_{3a}^* \end{bmatrix} \right\} \right) Wa_{(3,3)_{i-1}} + Wa_{(3,3)_{i-1}} \quad (13)$$

When using the formula (13), the constraint-type learning section 212a comes to update only the matrix elements which are non-zero, among the matrix elements of the separation matrix Wa (3, 3). Through learning the separation matrix Wa (3, 3) in such a manner, the near-end acoustic signal and the far-end acoustic signal which are included in the inputted signals can be separated.

Hereinunder, a purpose of partly constraining the matrix elements of the separation matrix and a reason why the near-end acoustic signal and the far-end acoustic signal can be separated even when the matrix elements are partly constrained will be described. First, in the above-described second embodiment, a case where in a state where the separation matrix has converged, sound sources on a far end move and a case where a large number of sound sources are on the far end are not particularly described. However, in the case where in the state where the separation matrix has converged, the sound sources on the far end move and in the case where the large number of sound sources are on the far end, in reality, transfer characteristics (a31(ω), a32(ω), etc.) change. This may cause the matrix elements (w12, w13), which are used for canceling echoes, to temporarily change through the learning in a configuration in which all the coefficients of the separation matrix are updated, as in the second embodiment. In the case where the matrix elements (w12, w13) temporarily change, the separation of the near-end acoustic signal and the far-end acoustic signal is incomplete, thereby temporarily deteriorating an effect of canceling echoes.

The matrix elements (w21, w31) are used to separate, as output signals y2a and y3a, a voice of a speaker S3 and a voice of a speaker S4, which are included in loudspeaker input signals (sp1, sp2), by using the detection signal m1. Here, The output signals y2a and y3a which are the far-end acoustic signals are not outputted from the first sound source separation section 210 and are used only for the learning performed by the learning section 212. Therefore, any signals which contribute to the separation of the output signals y2a and y3a which are the far-end acoustic signals are never included in the detection signal m1. Accordingly, in a state where the learning of the separation matrix has converged, there should be w21=w31=0. However, as in the second embodiment, in the configuration in which all the matrix elements of the separation matrix are updated, if actual transfer characteristics (a31(ω), a31(ω), etc.) change, for example, when the sound sources on the far end move, the matrix elements (w21, w31) temporarily change through the learning. When the matrix elements (w21, w31) temporarily change, the matrix element (w11) comes to temporarily change through the next learning. This causes the separation of the near-end acoustic signal and the far-end acoustic signal to be incomplete, thereby temporarily deteriorating the effect of canceling echoes.

In order to prevent such a temporal deterioration in the effect of cancelling echoes, in the present embodiment, the matrix elements of the separation matrix are partly constrained.

Hereinunder, a phenomenon of the temporal deterioration in the effect of cancelling the echoes, which is caused depending on the state of the sound sources on the far end, will be described by using formulae. In a formula (14), a first term in a right-hand side in the update formula (10) is expanded.

each other, matrix elements $\in \{\phi(y_i)y_j^*\}_{i \neq j}$ is $\in \{\phi(y_i)y_j^*\}_{i \neq j} \approx 0$. In a state where the learning of the separation matrix W has converged, the update amount ΔW vibrates in the vicinity of 0 (zero). In other words, all the matrix elements of the update amount ΔW are set to 0.

Here, a case where a state in which the learning of the separation matrix W has converged and the echo cancellation is being well performed changes to a state in which the transfer characteristics (a31(ω), a32(ω), etc.) on the far end have changed will be considered. In this case, estimated values of the matrix elements (w22, w23, w32, w33) of the separation matrix W which has converged do not correspond to the actual transfer characteristics. This makes the separation of the output signals y2a and y3a of the far-end acoustic signal incomplete. In other words, the independence between the output signals y2a and y3a is reduced and the output signals y2a and y3 come to be correlate with each other. In the formula (14), $\in \{\phi(y_{2a})y_{3a}^*\}$ and $\in \{(y_{3a})y_{2a}^*\}$ have values. In particular, in a case where a large number of the sound sources are on the far end, since the transfer characteristics on the far end invariably change, $\in \{\phi(y_{2a})y_{3a}^*\}$ and $\in \{\phi(y_{3a})y_{2a}^*\}$ invariably have values. In the matrix elements in the second and third rows of the first term in the right-hand side of the formula (14), $\in \{\phi(y_{2a})y_{3a}^*\}$ and $\in \{\phi(y_{3a})y_{2a}^*\}$ are included. Therefore, that $\in \{\phi(y_{2a})y_{3a}^*\}$ and $\in \{\phi(y_{3a})y_{2a}^*\}$ change means that the matrix elements in the second and third rows of the first term in the right-hand side of the formula (14) change.

When the matrix elements in the second and third rows of the first term in the right-hand side of the formula (14) change, the matrix elements (w21 to w23, w31 to w33) in the second and third rows of the separation matrix W which has been learned based on the change in the matrix elements also change. When the next learning is performed based on the change in the matrix elements (w23, w32), among the matrix elements in the second and third rows, the matrix elements (w12, w13) of the separation matrix W change. When the next learning is performed based on the matrix elements (w21, w31), the matrix element (w11) of the separation matrix W changes. Due to such a change in the matrix elements in the first row of the separation matrix W, the effect of cancelling echoes temporarily deteriorates.

Therefore, in the present embodiment, the matrix elements (w32, w23) and the matrix elements (w21, w31) of the separation matrix are constrained to be 0. Thus, even when the transfer characteristics on the far end change, the change in the matrix elements in the first row of the separation matrix W,

[Formula 14]

$$\begin{bmatrix} w_{11} & w_{12} & w_{13} \\ w_{21} & w_{22} & w_{23} \\ w_{31} & w_{32} & w_{33} \end{bmatrix}_i = \alpha \begin{bmatrix} (1-\varepsilon\{\phi(y_{1a})y_{1a}^*\})w_{11} - & (1-\varepsilon\{\phi(y_{1a})y_{1a}^*\})w_{12} - & (1-\varepsilon\{\phi(y_{1a})y_{1a}^*\})w_{13} - \\ \varepsilon\{\phi(y_{1a})y_{2a}^*\}w_{21} - & \varepsilon\{\phi(y_{1a})y_{2a}^*\}w_{22} - & \varepsilon\{\phi(y_{1a})y_{2a}^*\}w_{23} - \\ \varepsilon\{\phi(y_{1a})y_{3a}^*\}w_{31} - & \varepsilon\{\phi(y_{1a})y_{3a}^*\}w_{32} - & \varepsilon\{\phi(y_{1a})y_{3a}^*\}w_{33} - \\ \varepsilon\{\phi(y_{2a})y_{1a}^*\}w_{11} + & \varepsilon\{\phi(y_{2a})y_{1a}^*\}w_{12} + & \varepsilon\{\phi(y_{2a})y_{1a}^*\}w_{13} + \\ (1-\varepsilon\{\phi(y_{2a})y_{2a}^*\})w_{21} - & (1-\varepsilon\{\phi(y_{2a})y_{2a}^*\})w_{22} - & (1-\varepsilon\{\phi(y_{2a})y_{2a}^*\})w_{23} - \\ \varepsilon\{\phi(y_{2a})y_{3a}^*\}w_{31} - & \varepsilon\{\phi(y_{2a})y_{3a}^*\}w_{32} - & \varepsilon\{\phi(y_{2a})y_{3a}^*\}w_{33} - \\ \varepsilon\{\phi(y_{3a})y_{1a}^*\}w_{11} - & \varepsilon\{\phi(y_{3a})y_{1a}^*\}w_{12} - & \varepsilon\{\phi(y_{3a})y_{1a}^*\}w_{13} - \\ \varepsilon\{\phi(y_{3a})y_{2a}^*\}w_{21} + & \varepsilon\{\phi(y_{3a})y_{2a}^*\}w_{22} + & \varepsilon\{\phi(y_{3a})y_{2a}^*\}w_{23} + \\ (1-\varepsilon\{\phi(y_{3a})y_{3a}^*\})w_{31} & (1-\varepsilon\{\phi(y_{3a})y_{3a}^*\})w_{32} & (1-\varepsilon\{\phi(y_{3a})y_{3a}^*\})w_{33} \end{bmatrix}_{i-1} + \begin{bmatrix} w_{11} & w_{12} & w_{13} \\ w_{21} & w_{22} & w_{23} \\ w_{31} & w_{32} & w_{33} \end{bmatrix}_{i-1} \quad (14)$$

The first term in the right-hand side in the formula (14) indicates an update amount ΔW in learning of the separation matrix W. When output signals yi and yj are independent of which is caused by the learning, can be prevented, thereby preventing the temporal deterioration in the effect of cancelling echoes.

Next, as in the separation matrix Wa, a learning formula in a case where the matrix elements (w32, w23) and the matrix elements (w21, w31) are constrained to be 0 will be considered. By applying a learning formula of the formula (10) to the separation matrix Wa in the formula (12), a formula (15) is obtained.

[Formula 15]

$$\begin{bmatrix} w_{11} & w_{12} & w_{13} \\ 0 & w_{22} & 0 \\ 0 & 0 & w_{33} \end{bmatrix}_i = \quad (15)$$

$$\alpha \left( I - \varepsilon \left\{ \begin{bmatrix} \phi(y_{1a})y_{1a}^* & \phi(y_{1a})y_{2a}^* & \phi(y_{1a})y_{3a}^* \\ \phi(y_{2a})y_{1a}^* & \phi(y_{2a})y_{2a}^* & \phi(y_{2a})y_{3a}^* \\ \phi(y_{3a})y_{1a}^* & \phi(y_{3a})y_{2a}^* & \phi(y_{3a})y_{3a}^* \end{bmatrix} \right\} \right) \begin{bmatrix} w_{11} & w_{12} & w_{13} \\ 0 & w_{22} & 0 \\ 0 & 0 & w_{33} \end{bmatrix}_{i-1} +$$

$$\begin{bmatrix} w_{11} & w_{12} & w_{13} \\ 0 & w_{22} & 0 \\ 0 & 0 & w_{33} \end{bmatrix}_{i-1}$$

When the first term on the right-hand side in the formula (15) is once expanded and rearrangement is conducted, the same formula as the formula (13) is obtained. In other words, it is understood that the formula (13) is a learning formula which can be obtained by partly constraining the matrix elements of the separation matrix.

In the formula (13), when the learning of the separation matrix Wa has converged, the update amount ΔW is a 0 matrix. That the update amount ΔW is the 0 matrix means that $\varepsilon \{\phi(y_{1a})y_{2a}^*\} = \varepsilon \{\phi(y_{2a})y_{1a}^*\} = \varepsilon \{\phi(y_{1a})y_{3a}^*\} = \varepsilon \{\phi(y_{3a})y_{1a}^*\} = 0$ and that $1 - \varepsilon \{\phi(y_{1a})y_{1a}^*\} = 1 - \varepsilon \{\phi(y_{2a})y_{2a}^*\} = \varepsilon \{\phi(y_{3a})y_{3a}^*\} = 0$. It is understood from these that when the learning of the separation matrix Wa has converged, the output signal y1a which is the near-end acoustic signal and the output signal y2a which is the far-end acoustic signal are independent of each other, and the output signal y1a which is the near-end acoustic signal and the output signal y3a which is the far-end acoustic signal are independent of each other. In other words, it is understood that when the learning based on the formula (13) has converged, the near-end acoustic signal and the far-end acoustic signal are separated.

Note that the update amount ΔW being the 0 matrix has no relationship with values of $\varepsilon \{\phi(y_{2a})y_{3a}^*\}$ and $\varepsilon \{\phi(y_{3a})y_{2a}^*\}$. Therefore, it makes no difference whether or not the output signal y2a and the output signal y3a which are the far-end acoustic signals are independent of each other. In other words, with respect to the far-end acoustic signals, the output signal y2a and the output signal y3a which are independent of each other are not necessarily outputted.

As described above, by partly constraining the matrix elements of the separation matrix, even if the transfer characteristics on the far end change, the change in the matrix elements in the first row of the separation matrix W, which occurs through the learning, can be prevented, thereby preventing the temporal deterioration of the effect of cancelling echoes. In addition, in a case where the matrix elements of the separation matrix are partly constrained, an amount of calculation can be reduced as compared with a case where the matrix elements are not constrained.

Although as the learning formula in the present embodiment, the formula (13) is used, a formula (16) may be used.

Even when the formula (16) is used, the near-end acoustic signal and the far-end acoustic signal can be separated.

[Formula 16]

$$Wa_{(3,3)_i} = \quad (16)$$

$$\alpha \left( I - \varepsilon \left\{ \begin{bmatrix} \phi(y_{1a})y_{1a}^* & \phi(y_{1a})y_{2a}^* & \phi(y_{1a})y_{3a}^* \\ 0 & \phi(y_{2a})y_{2a}^* & 0 \\ 0 & 0 & \phi(y_{3a})y_{3a}^* \end{bmatrix} \right\} \right) Wa_{(3,3)_{i-1}} + Wa_{(3,3)_{i-1}}$$

Although in the present embodiment, the separation matrices which are set in the above-mentioned first sound source separation section 210 and second sound source separation section 220 are described, the present invention is not limited thereto. Even when the coefficients of the separation matrix W (4, 4) which is set in the above-mentioned sound source separation section 100 are partly constrained, the same effect as that of the present embodiment can be obtained. Hereinunder, constraint conditions which are common to separation matrices which are different in the number of rows and the number of columns are shown in formulae (17) to (19). The number of rows of the separation matrix is (M+K) and the number of columns of the separation matrix is (M+K), where M represents the number of microphones on the near end, which input detection signals to the sound source separation section, and K represents the number of loudspeakers on the near end, which input loudspeaker input signals to the sound source separation section. An input vector which is multiplied by the separation matrix includes detection signals detected by the microphones on the near end, which signals are present on rows corresponding to the first to the Mth rows of the separation matrix, and loudspeaker input signals, which signals are present on rows corresponding to the M+1th row to the M+Kth row of the separation matrix. In the formulae (17) to (19), i (i=1 to M+K) represents the number of rows and j (J=1 to M+K) represents the number of columns.

In the formula (17), constraint conditions for the matrix elements (w22, w23, w32, w33 in the 3×3 matrix) with respect to the transfer characteristics from the speakers (S3 and S4) on the far end to the microphones (31 and 41) on the far end are shown.

[Formula 17]

$$W_{ij} = \begin{cases} W_{ij} & (i = j) \\ 0 & (i \neq j) \end{cases} (i, j > M) \quad (17)$$

The constraint conditions shown in the formula (17) are effective in a case where it is unnecessary to further separate the far-end acoustic signals to a plurality of output signals which are independent of one another. Even in this case, the near-end acoustic signal and the far-end acoustic signal can be separated.

In the formula (18), constraint conditions for the matrix elements (w21, w31 in the 3×3 matrix) which are used to separate, as the output signals (y3, y4), the voices of the speakers (S3 and S4) on the far end, which are included in the loudspeaker input signals (sp1, sp2), by using the detection signals (m1, m2, etc.) detected by the microphones on the near end are shown.

[Formula 18]

$$W_{ij} = 0 (i > M, j \leq M) \quad (18)$$

Since the constraint conditions shown in the formula (18) are relevant to the matrix elements which are not related to the sound source separation processing in system processing, even when the constraint conditions shown in the formula (18) are applied, the near-end acoustic signal and the far-end acoustic signal can be separated.

In the formula (19), constraint conditions for the matrix elements (w11 in the 3×3 matrix) with respect to the transfer characteristics from the speakers (S1 and S2) on the near end to the microphones (11 and 21) on the near end are shown.

[Formula 19]

$$W_{ij} = \begin{cases} W_{ij} & (i = j) \\ 0 & (i \neq j) \end{cases} (i, j \leq M) \quad (19)$$

The constraint conditions shown in the formula (19) are effective in a case where it is unnecessary to further separate the far-end acoustic signals to a plurality of output signals which are independent of one another. Even in this case, the near-end acoustic signal and the far-end acoustic signal can be separated.

Fourth Embodiment

In a fourth embodiment, a case where the above-described sound source separation processing performed in the sound source separation section 100 is realized in a computer system by using a computer program will be described. The computer system is constructed of a microprocessor, a ROM, a RAM and the like. The RAM has the computer program stored therein. The microprocessor operates in accordance with the computer program, whereby the sound source separation processing performed in the sound source separation section 100 is realized. The computer program, in order to realize the sound source separation processing performed in the sound source separation section 100, is constructed by combining a plurality of instruction codes which indicate instructions to the computer system. In addition, the sound source separation processing performed in the first sound source separation section 210 and the second sound source separation section 220 may be realized in the computer system by using the computer program.

Figure 7:
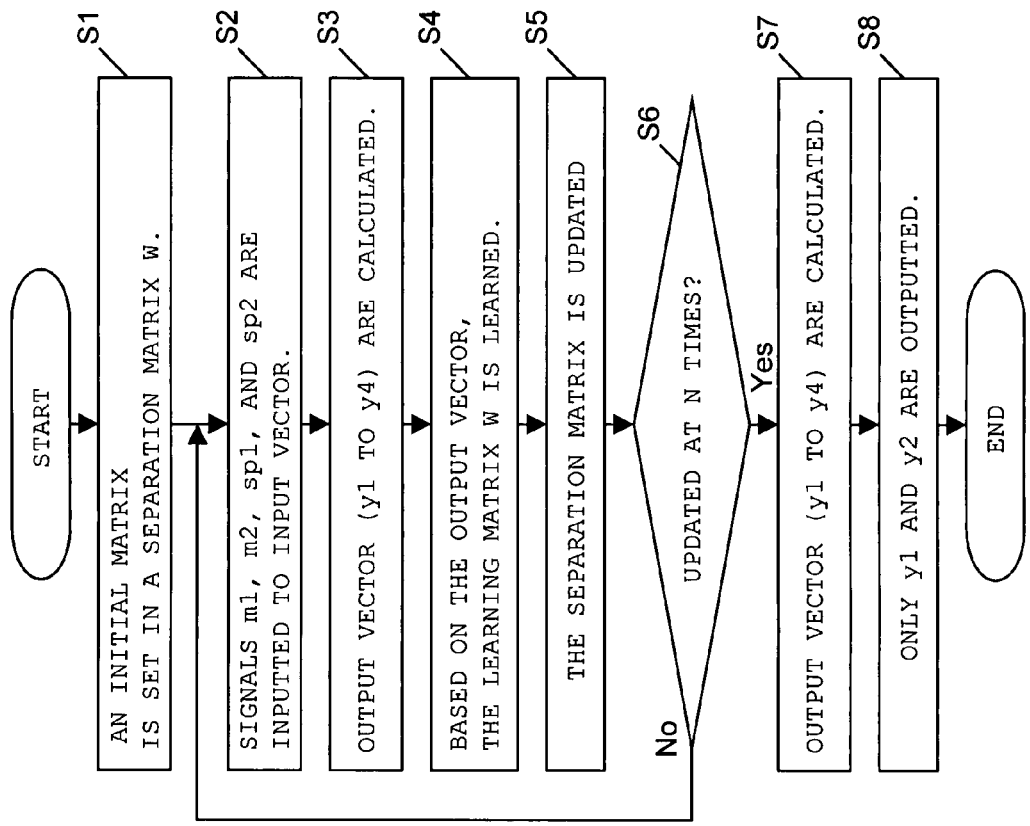
FIG. 7 is a diagram showing a program processing flow in which sound source separation processing performed in the sound source separation section 100 is realized.

With reference to FIG. 7, a program processing flow in which the sound source separation processing performed in the sound source separation section 100 is realized will be described. FIG. 7 is a diagram showing the program processing flow in which the sound source separation processing performed in the sound source separation section 100 is realized. In FIG. 7, in a separation section 101 in the sound source separation section 100, for example, a unit matrix is set as an initial matrix (step S1). Next, after the process at step S1, the separation section 101 receives, as an input vector, detection signals (m1(ω), m2(ω)) and loudspeaker input signals (sp1(ω), sp2(ω)) (step S2). Next, after the process at step S2, the separation section 101, by using the formula (5) based on the currently set separation matrix W, calculates output signals y1 to y4 which are included in an output vector (step S3). Next, after the process at step S3, the learning section 102, based on the output signals y1 to y4 which have been calculated at step S3, learns the separation matrix W by using the formula (6) (step S4). Specifically, the learning section 102 calculates a high-order correlation matrix by respectively calculating high-order correlations (for example, $\{\phi(y_3)y_2^*\}$, etc.) among the output signals y1 to y4. The learning section 102, by using the calculated high-order correlation matrix, learns the separation matrix to be updated. Next, after the process at step S4, the learning section 102 updates the separation matrix W, which is currently set in the separation section 101, to the separation matrix W which has been learned at step S4 (step S5). Next, after the process at step S5, the learning section 102 determines whether or not the update is performed at N (N is an integer greater than or equal to one) times (step S6). When the update is not performed at N times (No at step S6), the processing returns to step S2. When the update is performed at N times (Yes at step S6), the separation section 101 respectively calculates the output signals y1 to y4, which are included in the output vector, by using the formula (5) based on the updated separation matrix W (step S7). Through performing the process at step S7, the near-end acoustic signal and the far-end acoustic signal which are included in the detection signals (m1(ω), m2(ω)) can be separated. Next, after the process at step S7, the separation section 101 outputs only the output signals y1 and y2 which are the near-end acoustic signals (step S8). Through performing the process at step S8, the far-end acoustic signals which are included in the detection signals (m1(ω), m2(ω)) are cancelled as echoes.

Through performing the program processing shown in FIG. 7, the above-described sound source separation processing performed in the sound source separation section 100 can be realized in the computer system.

The above-described sound source separation processing can be realized also in the first sound source separation section 210a, in which the matrix elements are partly constrained, in the computer system by using the computer program. The program processing in this case is different from the program processing shown in FIG. 7 in that the processing in this case is performed while constraining the predetermined matrix elements, which are shown in the formulae (17) to (19), to be 0. In other word, at step S4 and step S5, the learning section 102 performs the processing only for the matrix elements other than the predetermined matrix elements. And the processing is performed while constraining the predetermined matrix elements to be 0.

Other Modified Examples

Although in the above-described first to third embodiments, the multichannel echo canceller according to the present invention is described, the echo canceller according to the present invention is not limited to each of the above-described first to third embodiments. The multichannel echo canceller according to the present invention may be any of the below-described embodiments.

(1) Apart of or all of the components which are included in the multichannel echo canceller according to each of the above-described first to third embodiments may be constructed of one system LSI (Large Scale Integration). The system LSI is a super-multifunctional LSI manufactured by integrating a plurality of components on one chip. In the system LSI, a computer system which includes, for example, a microprocessor, a ROM, a RAM, and the like can be realized. The RAM has a computer program stored therein. The microprocessor operates in accordance with the computer program, whereby the system LSI achieves functions thereof as the computer system.

(2) Apart of or all of the components which are included in the multichannel echo canceller according to each of the above-described first to third embodiments may be constructed of an IC card or a stand-alone module which can be attached and detached to/from the multichannel echo canceller. The IC card and the module can realize a computer system which includes a microprocessor, a ROM, a RAM, and the like. The RAM has a computer program stored therein. The microprocessor operates in accordance with the computer program, whereby the IC card or the module achieves functions thereof as the computer system. The IC card or the module may include the super-multifunctional LSI mentioned above in (1). The IC card or the module may be tamper-proof.

(3) The present invention may be a multichannel echo cancelling method based on the above-described first to third embodiments. The present invention may be a computer program for realizing the multichannel echo cancelling method on a computer. The present invention may be digital signals which are represented in the computer program. Furthermore, the present invention may be a computer-readable recording medium (for example, a flexible disk, a hard disk, a CD-ROM, an MO, a DVD, a DVD-ROM, a DVD-RAM, BD (Blue-ray Disc), or a semiconductor memory, etc.) which has stored therein the above-mentioned computer program or digital signals. Furthermore, the present invention may be the above-mentioned computer program or digital signals transmitted via an electric communication line (a wireless communication line, a wired communication line, a network which is typified by the Internet, or data broadcasting). Furthermore, the present invention may be a computer system including a microprocessor and a memory, which may be realized as the microprocessor operates in accordance with a computer program stored in the memory. Furthermore, the present invention may be realized on another independent computer system by transferring the above-mentioned computer program or digital signals to the recording medium through recording therein (or, transferring the above-mentioned computer program or digital signals via a network or the like).

(4) The above-described first to third embodiments and the above-described modified examples (1) to (3) may be appropriately combined.

The multichannel echo canceller according to the present invention is capable of cancelling echoes in an invariably stable manner in the multichannel reproduction without deteriorating sound quality and enables stable echo cancellation regardless of which is performed, a double talk or a single talk. The multichannel echo canceller according to the present invention is applied to not only a conferencing system and a handsfree telephone but also a voice recognition system or the like used in guide announcement reproduction and music reproduction.

While the invention has been described in detail, the foregoing description is in all aspects illustrative and not restrictive. It is understood that numerous other modifications and variations can be devised without departing from the scope of the invention.

What is claimed is:

1. A multichannel echo canceller provided in a first location and used in an acoustic system in which acoustic signals are transmitted between the first location and a second location in an interactive manner, wherein a first acoustic signal emitted from one or more sound sources present in the first location is detected by a plurality of microphones provided in the first location, wherein a second acoustic signal emitted from one or more sound sources present at the second location is detected by a plurality of microphones provided in the second location, wherein an acoustic signal transmitted from the first location to the second location is reproduced by a plurality of loudspeakers provided in the second location, and wherein an acoustic signal transmitted from the second location to the first location is reproduced by a plurality of loudspeakers provided in the first location, the multichannel echo canceller comprising:
an obtaining section that obtains (i) detection signals detected by the plurality of microphones provided in the first location and (ii) loudspeaker input signals transmitted from the second location to the first location, the detection signals detected by the plurality of microphones provided in the first location including (i) the first acoustic signal and (ii) reproduced acoustic signals obtained by the loudspeaker input signals being reproduced by the plurality of loudspeakers provided in the first location; and
an echo cancellation section that (i) multiplies a separation matrix and an input vector including the detection signals and the loudspeaker input signals, (ii) separates (a) the first acoustic signal, which is included in the detection signals, from (b) the second acoustic signal, which is included in the reproduced acoustic signals included in the detection signals, and (iii) outputs the separated first acoustic signal,
wherein the separation matrix separates (i) the first acoustic signal, which is included in the detection signals, from (ii) the second acoustic signal, which is included in the reproduced acoustic signals included in the detection signals, the separation matrix including:
a first submatrix including a plurality of matrix elements concerning each transfer characteristic from the plurality of loudspeakers provided in the first location to the plurality of microphones provided in the first location;
a second submatrix including a plurality of matrix elements concerning each transfer characteristic from the one or more sound sources present in the second location to the plurality of microphones provided in the second location;
a third submatrix including a plurality of matrix elements that separate, from the detection signals, the second acoustic signal, which is included in the reproduced acoustic signals included in the detection signals; and
a fourth submatrix including a plurality of matrix elements concerning each transfer characteristic from the one or more sound sources present in the first location to the plurality of microphones provided in the first location.

2. The multichannel echo canceller according to claim 1, wherein the separation matrix is learned in accordance with an independent component analysis with the second submatrix formed of a diagonal matrix whose elements other than the diagonal elements are all 0.

3. The multichannel echo canceller according to claim 1, wherein the separation matrix is learned in accordance with an independent component analysis with the third submatrix formed of a zero matrix whose elements are all 0.

4. The multichannel echo canceller according to claim 1, wherein the separation matrix is learned in accordance with an independent component analysis with the fourth submatrix formed of a diagonal matrix whose elements other than the diagonal elements are all 0.

5. A multichannel echo canceller provided in a first location and used in an acoustic system in which acoustic signals are transmitted between the first location and a second location in an interactive manner, wherein a second acoustic signal emitted from one or more sound sources present at the second location is detected by a plurality of microphones provided in the second location, wherein an acoustic signal transmitted from the first location to the second location is reproduced by a plurality of loudspeakers provided in the second location, and wherein an acoustic signal transmitted from the second location to the first location is reproduced by a plurality of loudspeakers provided in the first location, the multichannel echo canceller comprising:

a plurality of microphones provided in the first location that detect detection signals including (i) a first acoustic signal emitted from one or more sound sources present in the first location and (ii) reproduced acoustic signals obtained by loudspeaker input signals transmitted from the second location to the first location being reproduced by the plurality of loudspeakers provided in the first location;

an obtaining section that obtains (i) the detection signals detected by the plurality of microphones provided in the first location and (ii) the loudspeaker input signals; and an echo cancellation section that (i) multiplies a separation matrix and an input vector including the detection signals and the loudspeaker input signals, and (ii) separates (a) the first acoustic signal, which is included in the detection signals, from (b) the second acoustic signal, which is included in the reproduced acoustic signals included in the detection signals, wherein the separation matrix separates (i) the first acoustic signal, which is included in the detection signals, from (ii) the second acoustic signal, which is included in the reproduced acoustic signals included in the detection signals, the separation matrix including:

a first submatrix including a plurality of matrix elements concerning each transfer characteristic from the plurality of loudspeakers provided in the first location to the plurality of microphones provided in the first location;

a second submatrix including a plurality of matrix elements concerning each transfer characteristic from the one or more sound sources present in the second location to the plurality of microphones provided in the second location;

a third submatrix including a plurality of matrix elements that separate, from the detection signals, the second acoustic signal, which is included in the reproduced acoustic signals included in the detection signals; and a fourth submatrix including a plurality of matrix elements concerning each transfer characteristic from the one or more sound sources present in the first location to the plurality of microphones provided in the first location, and wherein the multichannel echo canceller further comprises an output section that outputs the separated first acoustic signal.

6. A multichannel echo canceller provided in a first location and used in an acoustic system in which acoustic signals are transmitted between the first location and a second location in an interactive manner, wherein a second acoustic signal emitted from one or more sound sources present at the second location is detected by a plurality of microphones provided in the second location, and wherein an acoustic signal transmitted from the first location to the second location is reproduced by a plurality of loudspeakers provided in the second location, the multichannel echo canceller comprising:

a plurality of loudspeakers provided in the first location that reproduce loudspeaker input signals transmitted from the second location to the first location;

a plurality of microphones provided in the first location that detect detection signals including (i) a first acoustic signal emitted from one or more sound sources present in the first location and (ii) reproduced acoustic signals obtained from the loudspeaker input signals reproduced by the plurality of loudspeakers provided in the first location;

an obtaining section that obtains (i) the detection signals detected by the plurality of microphones provided in the first location and (ii) the loudspeaker input signals; and an echo cancellation section that (i) multiplies a separation matrix and an input vector including the detection signals and the loudspeaker input signals, and (ii) separates (a) the first acoustic signal, which is included in the detection signals, from (b) the second acoustic signal, which is included in the reproduced acoustic signals included in the detection signals, wherein the separation matrix separates (i) the first acoustic signal, which is included in the detection signals from (ii) the second acoustic signal, which is included in the reproduced acoustic signals included in the detection signals, the separation matrix including:

a first submatrix comprising a plurality of matrix elements concerning each transfer characteristic from the plurality of loudspeakers provided in the first location to the plurality of microphones provided in the first location;

a second submatrix comprising a plurality of matrix elements concerning each transfer characteristic from the one or more sound sources present in the second location to the plurality of microphones provided in the second location;

a third submatrix comprising a plurality of matrix elements that separate, from the detection signals, the second acoustic signal, which is included in the reproduced acoustic signals included in the detection signals; and a fourth submatrix comprising a plurality of matrix elements concerning each transfer characteristic from the one or more sound sources present in the first location to the plurality of microphones provided in the first location, and wherein the multichannel echo canceller further comprises an output section that outputs the separated first acoustic signal.

7. A multichannel echo canceller provided in a first location and used in an acoustic system in which acoustic signals are transmitted between the first location and a second location in an interactive manner, wherein a first acoustic signal emitted from one or more sound sources present in the first location is detected by two microphones provided in the first location, wherein a second acoustic signal emitted from one or more sound sources present at the second location is detected by two microphones provided in the second location, wherein an acoustic signal transmitted from the first location to the second location is reproduced by two loudspeakers provided in the second location, and wherein an acoustic signal transmitted from the second location to the first location is reproduced by two loudspeakers provided in the first location, the multichannel echo canceller comprising:

an obtaining section that obtains (i) detection signals m1 and m2 from the two microphones provided in the first location and (ii) two loudspeaker input signals sp1 and sp2 transmitted from the second location to the first location, the detection signals m1 and m2 detected by the two microphones provided in the first location including (i) first acoustic signals y1 and y2 and (ii)

reproduced acoustic signals obtained by the two loudspeaker input signals sp1 and sp2 being reproduced by the two loudspeakers provided in the first location; and an echo cancellation section that uses a separation matrix W for separating (i) the first acoustic signals y1 and y2, which are included in the detection signals m1 and m2, from (ii) second acoustic signals y3 and y4, which are included in the reproduced acoustic signals included in the detection signals m1 and m2, wherein the separation matrix is expressed as:

$$W = \begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix},$$

wherein an input vector I, which includes the detection signals m1 and m2 and the two loudspeaker input signals sp1 and sp2, is expressed as:

$$I = \begin{bmatrix} m1 \\ m2 \\ sp1 \\ sp2 \end{bmatrix},$$

wherein the first acoustic signals y1 and y2 included in the detection signals m1 and m2 are separated from the second acoustic signals y3 and y4 by performing a matrix operation expressed as:

$$\begin{bmatrix} y_1 \\ y_2 \\ y_3 \\ y_4 \end{bmatrix} = \begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix} \begin{bmatrix} m1 \\ m2 \\ sp1 \\ sp2 \end{bmatrix}, \text{ and}$$

wherein the echo cancellation section outputs the separated first acoustic signals y1 and y2.

8. The multichannel echo canceller according to claim 7, wherein the separation matrix is learned as W34=W43=0, in accordance with an independent component analysis.

9. The multichannel echo canceller according to claim 7, wherein the separation matrix is learned as W31=W32=W41=W42=0, in accordance with an independent component analysis.

10. The multichannel echo canceller according to claim 7, wherein the separation matrix is learned as W12=W21=0, in accordance with an independent component analysis.

11. A multichannel echo cancelling method for performing a multichannel echo cancellation for a first location and for being used in an acoustic system in which acoustic signals are transmitted between the first location and a second location in an interactive manner, wherein a first acoustic signal emitted from one or more sound sources present in the first location is detected by a plurality of microphones provided in the first location, wherein a second acoustic signal emitted from one or more sound sources present at the second location is detected by a plurality of microphones provided in the second location, wherein an acoustic signal transmitted from the first location to the second location is reproduced by a plurality of loudspeakers provided in the second location, and wherein an acoustic signal transmitted from the second location to the first location is reproduced by a plurality of loudspeakers provided in the first location, the multichannel echo cancelling method comprising:

an obtaining step of obtaining (i) detection signals detected by the plurality of microphones provided in the first location and (ii) loudspeaker input signals transmitted from the second location to the first location, the detection signals detected by the plurality of microphones provided in the first location including (i) the first acoustic signal and (ii) reproduced acoustic signals obtained by the loudspeaker input signals being reproduced by the plurality of loudspeakers provided in the first location;

a separating step of separating (i) the first acoustic signal, which is included in the detection signals, from (ii) the second acoustic signal, which is included in the reproduced acoustic signals included in the detection signals, by multiplying a separation matrix and an input vector including the detection signals and the loudspeaker input signals; and a cancellation step of canceling the second acoustic signal, which is included in the reproduced acoustic signals included in the detection signals, as an echo by outputting the separated first acoustic signal, wherein the separation matrix separates (i) the first acoustic signal, which is included in the detection signals, from (ii) the second acoustic signal, which is included in the reproduced acoustic signals included in the detection signals, the separation matrix including:

a first submatrix including a plurality of matrix elements concerning each transfer characteristic from the plurality of loudspeakers provided in the first location to the plurality of microphones provided in the first location;

a second submatrix including a plurality of matrix elements concerning each transfer characteristic from the one or more sound sources present in the second location to the plurality of microphones provided in the second location;

a third submatrix including a plurality of matrix elements that separate, from the detection signals, the second acoustic signal, which is included in the reproduced acoustic signals included in the detection signals; and a fourth submatrix including a plurality of matrix elements concerning each transfer characteristic from the one or more sound sources present in the first location to the plurality of microphones provided in the first location.

12. An integrated circuit for performing a multichannel echo cancellation for a first location and for being used in an acoustic system in which acoustic signals are transmitted between the first location and a second location in an interactive manner, wherein a first acoustic signal emitted from one or more sound sources present in the first location is detected by a plurality of microphones provided in the first location, wherein a second acoustic signal emitted from one or more sound sources present at the second location is detected by a plurality of microphones provided in the second location, wherein an acoustic signal transmitted from the first location to the second location is reproduced by a plurality of loudspeakers provided in the second location, and wherein an acoustic signal transmitted from the second location to the first location is reproduced by a plurality of loudspeakers provided in the first location, the integrated circuit comprising:

an obtaining section that obtains (i) detection signals detected by the plurality of microphones provided in the first location and (ii) loudspeaker input signals transmitted from the second location to the first location, the detection signals detected by the plurality of microphones provided in the first location including (i) the first acoustic signal and (ii) reproduced acoustic signals obtained by the loudspeaker input signals being reproduced by the plurality of loudspeakers provided in the first location; and an echo cancellation section that (i) multiplies a separation matrix and an input vector including the detection signals and the loudspeaker input signals, (ii) separates (a) the first acoustic signal, which is included in the detection signals, from (b) the second acoustic signal, which is included in the reproduced acoustic signals included in the detection signals, and (iii) outputs the separated first acoustic signal, wherein the separation matrix separates (i) the first acoustic signal, which is included in the detection signals from (ii) the second acoustic signal, which is included in the reproduced acoustic signals included in the detection signals, the separation matrix including:

a first submatrix including a plurality of matrix elements concerning each transfer characteristic from the plurality of loudspeakers provided in the first location to the plurality of microphones provided in the first location;

a second submatrix including a plurality of matrix elements concerning each transfer characteristic from the one or more sound sources present in the second location to the plurality of microphones provided in the second location;

a third submatrix including a plurality of matrix elements that separate, from the detection signals, the second acoustic signal, which is included in the reproduced acoustic signals included in the detection signals; and a fourth submatrix including a plurality of matrix elements concerning each transfer characteristic from the one or more sound sources present in the first location to the plurality of microphones provided in the first location.

13. A non-transitory computer-readable recording medium which has stored therein a computer program for use in an acoustic system in which acoustic signals are transmitted between a first location and a second location in an interactive manner, wherein a first acoustic signal emitted from one or more sound sources present in the first location is detected by a plurality of microphones provided in the first location, wherein a second acoustic signal emitted from one or more sound sources present at the second location is detected by a plurality of microphones provided in the second location, wherein an acoustic signal transmitted from the first location to the second location is reproduced by a plurality of loudspeakers provided in the second location, wherein an acoustic signal transmitted from the second location to the first location is reproduced by a plurality of loudspeakers provided in the first location, and wherein, when executed, the computer program causes the acoustic system to perform a method comprising:

an obtaining step of obtaining (i) detection signals detected by the plurality of microphones provided in the first location and (ii) loudspeaker input signals transmitted from the second location to the first location, the detection signals detected by the plurality of microphones provided in the first location including (i) the first acoustic signal and (ii) reproduced acoustic signals obtained by the loudspeaker input signals being reproduced by the plurality of loudspeakers provided in the first location;

a separating step of separating (i) the first acoustic signal, which is included in the detection signals, from (ii) the second acoustic signal, which is included in the reproduced acoustic signals included in the detection signals, by multiplying a separation matrix and an input vector including the detection signals and the loudspeaker input signals; and, a cancellation step of canceling the second acoustic signal, which is included in the reproduced acoustic signals included in the detection signals, as an echo by outputting the separated first acoustic signal, wherein the separation matrix separates (i) the first acoustic signal, which is included in the detection signals, from (ii) the second acoustic signal, which is included in the reproduced acoustic signals included in the detection signals, the separation matrix including:

a first submatrix including a plurality of matrix elements concerning each transfer characteristic from the plurality of loudspeakers provided in the first location to the plurality of microphones provided in the first location;

a second submatrix including a plurality of matrix elements concerning each transfer characteristic from the one or more sound sources present in the second location to the plurality of microphones provided in the second location;

a third submatrix including a plurality of matrix elements that separate, from the detection signals, the second acoustic signal, which is included in the reproduced acoustic signals included in the detection signals; and a fourth submatrix including a plurality of matrix elements concerning each transfer characteristic from the one or more sound sources present in the first location to the plurality of microphones provided in the first location.

* * * * *